US008583549B1

(12) United States Patent
Mohsenzadeh

(10) Patent No.: US 8,583,549 B1
(45) Date of Patent: Nov. 12, 2013

(54) SYSTEMS, DEVICES, AND METHODS FOR MANAGING A PAYMENT TRANSACTION

(76) Inventor: Hossein Mohsenzadeh, Medford, MA (US)

(*) Notice: Subject to any disclaimer, the term of this patent is extended or adjusted under 35 U.S.C. 154(b) by 0 days.

(21) Appl. No.: 13/443,882

(22) Filed: Apr. 10, 2012

(51) Int. Cl.
G06Q 40/00 (2012.01)
(52) U.S. Cl.
USPC .............................................. 705/39; 705/38
(58) Field of Classification Search
USPC .................................................... 705/38, 39
See application file for complete search history.

(56) References Cited

U.S. PATENT DOCUMENTS

2010/0153266 A1* 6/2010 Plunkett et al. ................ 705/40
2010/0169214 A1* 7/2010 Nonni et al. .................... 705/44

* cited by examiner

Primary Examiner — Jagdish Patel
(74) Attorney, Agent, or Firm — Atanu Das; Techlaw LLP

(57) ABSTRACT

Embodiments of the present disclosure include a method for managing a payment transaction. Such a method includes receiving a first transaction information including a first rendered card provided by a user using a computer server. A further step may include accessing BIN and rate information from a table, using the computer server, based on the first transaction information. An additional step may include calculating, using the computer server, a first cost based on the BIN and rate information and calculating a first convenience fee for the first rendered card. Other steps may be determining a first suggested card type by the computer server based on an algorithm implemented by software such that the first suggested card type has a lower cost than the first cost and a lower convenience fee than the first convenience fee as well as providing the first suggested card type to the user.

30 Claims, 10 Drawing Sheets

SYSTEMS, DEVICES, AND METHODS FOR MANAGING A PAYMENT TRANSACTION

BACKGROUND

Traditional card transaction practices include authorization, clearing, settlement and funding actions to complete card transactions between several entities such as the cardholder, merchant, acquirer, issuer, and card network. Card transactions include payments made using different types of payment cards such as a credit card, debit card, gift card, etc. The authorization action includes a cardholder presenting a card as payment to the merchant and the merchant submitting the transaction to the acquirer. The acquirer verifies the card holder has available funds for settlement by passing at least the card number, the transaction type and the amount to the card network and obtains a transaction authorization. Settlement or clearing of the transactions is typically done by the merchant once per day and in a batch containing all the day's transaction. The settlement is passed to the merchant acquirer. The merchant acquirer subsequently settles the transactions further with the appropriate card network such as VISA®, MasterCard® or American Express®, NYCE® etc. Almost all transactions incur an interchange fee that the card network designates per published rates. Interchange fees are collected by the card networks from merchants either on daily or monthly basis. Card networks then remit these interchange fee to the card issuing banks. Depending on the card type, transaction type and the merchant type among other factors different interchange fees may be assessed by the card network for the same purchase transaction. For example, the card network may charge the merchant an interchange fee of 1.85% of the sale price plus $0.10 for a typical credit card rendered, whereas the same merchant may be assessed an interchange fee of 2.4% of sale price plus $0.10 for a reward credit card for the purchase of the same good, payment method (i.e. online) and using the same card network (i.e. VISA®).

Further, the same merchant may be charged an even higher rate for a business card issued on the same card network and by the same card issuer for exactly the same transaction. Alternatively, a reward card might be charged a higher interchange fee than a non-reward card on the same network. Debit cards participating in more than one network e.g. STAR® and MasterCard® may be assessed a different interchange fee depending on the network used by the merchant. Therefore, merchants have an incentive to find the least expensive method to process card transactions (i.e. process card transactions through the lowest cost network) to reduce card processing costs; costs that may add up to millions of dollars a year.

BRIEF SUMMARY

Embodiments of the present disclosure provide systems, methods, and devices for managing payment transactions. Persons of ordinary skill in the art would recognize that different fees are incurred when a cardholder presents different cards to a merchant for processing. These fees include an interchange fee, a card network fee, and a card processor fee. The interchange fee is assessed by the card network. The card network collects the interchange fee from the merchant's acquirer on behalf of the issuer and in turn the merchant acquirer collects the fee from the merchant itself. The card network fee is charged by the card network such as VISA®, MasterCard®, NYCE® or Star®. The card processor fee is charged by a processor of the card transaction, such as First Data, Elavon, Vantiv, etc. Thus, for example, if a VISA® debit card issued by Chase bank is rendered to a merchant and processed by First Data, the interchange fee would be collected by the card network VISA from the merchant acquirer and paid to Chase bank, the card network fee would be due to VISA, the processor fee would be due to First Data. All fees collected above are typically paid by the merchant as part of doing business and therefore the merchant has much incentive to reduce these fees. In one embodiment, the cost of processing the card payment transaction may be the total of the interchange fee, card network fee, and processor fee, as shown by the following equation:

$$\text{Cost} = \text{interchange fee} + \text{card network fee} + \text{processor fee} \quad (1)$$

Persons of ordinary skill in the art would understand that in other embodiments the cost may include a subset or additional fees to those shown in the above equation. Further, many debit and credit card issuers offer various card types with various features that are chosen by the issuers within guidelines provided by the card networks, to meet the needs of different types of cardholders, and result in different interchange rates to the merchants. For example at present a VISA® credit card issuer may offer a Consumer Credit VISA®, Consumer Rewards® or Corporate credit card, each having different features for the cardholders such as extended warranties on purchases or reward points, and each having a different interchange rate. For example, a retailer such as Staples® selling a $100 toner cartridge for a laser printer might have to pay $3.05 to its acquirer (2.95%+$0.10) if a Corporate Credit card is used to purchase the toner cartridge, whereas if a Consumer Credit card is used to purchase that same toner cartridge, then it will only cost Staples $1.90 (1.80%+$0.10) in interchange fees due to differential interchange pricing set at the card network. Typically, interchange and card network fees associated with debit card transactions may be lower than fees associated with credit card transactions because the perceived risk to the issuer is lowered as funds availability is verified at the time of authorizations, among other reasons. Further, most debit card issuers are members of at least two separate card networks. For example, debit card issuer Bank of America may be member of Visa® as well Star® debit networks and therefore cards issued by Bank of America may be processed through either network based on cardholder preference, merchant preference, or depending on the rules of the networks. That allows the merchant the capability of routing card transactions to one of those networks for processing. Traditionally regional debit networks such as STAR®, NYCE® and Pulse® charge lower interchange fees for processing transactions than larger card networks such as VISA® or MasterCard®. Historically, the regional networks were initially developed as ATM networks but within the last 20 years they have increased the capabilities of their networks to enable payment acceptance by merchants. For example, the regional networks have developed technologies to accept ATM PINs at the point of purchase where the cardholder inputs a PIN on a PIN pad after being prompted to do so at the time of purchase. These transactions are called PIN based debit or PIN debit and are relatively secure from fraud due to the nature of PIN based authorization. Similarly, the regional networks began to offer companies that have recurring billing such as utilities, municipality etc. ability to use the regional networks to process debit card transactions that are conducted via Internet or telephone without a PIN. That is, the card is not physically presented to the merchant at the point of sale and no PIN is inputted to validate the transaction. Such transactions are called PIN-less debit transactions where a PIN is not entered during the payment transaction. Recently virtual PIN pads have been offered for securely capturing a PIN for card payment transactions conducted via Internet, where the card is not rendered at a point of sale. Moreover, the recently passed Durbin amendment part of The Dodd-Frank Wall Street Reform and Consumer Protection Act (Pub. L. 111-203, H.R. 4173), requires all debit cards issued by US financial institutions to support processing through at least two unrelated debit card networks. In addition, the new Durbin amendment regulates the interchange fee for debit card issuing banks with assets greater than $10 Billion.

In another embodiment, some merchants such as utility companies charge a convenience fee to process or handle cards for payment transactions. Such a convenience fee may include a profit in addition to the cost incurred by the merchant, which includes the interchange fee, card network fee, and processor fee as shown in the following equation.

$$\text{Convenience fee} = \text{cost} + \text{profit} \quad (2)$$

The convenience fee may be calculated by different algorithms known in the art and include different variables such as expected profit, price elasticity, volume of card payment transactions and other economic and non-economic variables. Alternative embodiments include that the different algorithms calculate dynamically the convenience fee based on a discount from a static convenience fee. The static convenience fee may be determined by the factors mentioned above.

Embodiments of the present disclosure include a method for managing a payment transaction. The method includes receiving at a computer server, a first transaction information including a first rendered card information payment amount, and merchant type. A further step in the method may include accessing BIN and rate information from a table, using the computer server, based on the first transaction information stored in a computer. In addition, the method may include calculating, using the computer server, a first cost based on the BIN and rate information and calculating a first convenience fee for the first rendered card. Also, the method may include determining a first suggested card type by the computer server based on an algorithm implemented by software such that the first suggested card type has a lower cost than the first cost and a lower convenience fee than the first convenience fee and may also provide the first suggested card type to a user.

Moreover, the method may include calculating a first suggested convenience fee for the first suggested card type as well as providing the first suggested convenience fee to the user. Further, the first rendered card information is selected from the group consisting of a BIN or a card number. In addition, the table may have BIN and rate information is stored in one or more storage devices. Also, the method may include storing a subset of the first transaction information by the computer server.

Further, the method may include receiving, at a computer server, a second transaction information including a second rendered card information, accessing BIN and rate information from the table, using the computer server, based on the second transaction information as well as calculating, using the computer server, a second cost based on the BIN and rate table information and a second convenience fee for the second rendered card. In addition, the method may include determining a second suggested card type by the computer server based on an algorithm implemented by software such that the second suggested card type has a lower cost than the first cost and the second cost, and the second suggested card type has a lower convenience fee than the first convenience fee and the second convenience fee as well as providing the second suggested card type to the user.

Moreover, the method may include storing a subset of the first transaction information by the computer server as well as storing a subset of the second transaction information by the computer server. Further, the method may include accessing the first transaction information, and processing the first transaction information on a card network. In addition, the method may include receiving instructions from the user to select one of the rendered cards for the transaction, accessing the transaction information corresponding to the selected rendered card, and processing the transaction information on a card network. Persons of ordinary skill in the art would understand from the disclosed embodiments that a user may render multiple cards (e.g. more than two) and the systems and methods. Also, the method may include determining that a rendered card is on a blocking list stored by the computer server further blocking the processing of the rendered card.

Further, transaction information may be selected from the group consisting of payment information, payment amount, transaction type, merchant information, merchant type, merchant category, card information, card type, the card number, BIN, card expiration date, cardholder address, PIN, security code, asset size of the card issuer, and card networks of which the card issuer is a member. In addition, each of the suggested card type can be selected from the group consisting of a credit card, debit card, prepaid card, charge card, reward credit card, corporate credit card, rewards debit card, retailer credit card, and gift card.

Embodiments of the disclosure include a system for managing a payment transaction. The system includes one or more processors, one or more storage devices, each coupled to the one or more processors and one or more communication interfaces coupled to the one or more processors and capable of being coupled to one or more communication networks. Further components may include one or more software applications residing on the system, implemented by the one or more processors. The one of more software applications may include a processing engine that receives a first transaction information including a first rendered card information, payment amount, and merchant type. Other software applications may be one or more look up engines that (i) access BIN and rate information from a table based on the first transaction information stored in a computer; and (ii) pass the BIN and rate table information to the processing engine. In addition, the processing engine further: (i) calculates a first cost based on the BIN and rate information and calculates a first convenience fee for the first rendered card; (ii) determines a first suggested card type based on an algorithm implemented by software such that the first suggested card type has a lower cost than the first cost and a lower convenience fee than the first convenience fee; (iii) provides the first suggested card type to a user.

Moreover, the processing engine calculates a first suggested convenience fee for the first suggested card type as well as provides first suggested convenience fee to the user. Further, the first rendered card information is selected from a group consisting of a BIN or a card number. In addition, the table having BIN and rate information is stored in one or more storage devices. Also, the processing engine stores a subset of the first transaction information in the one or more storage devices.

In addition, the processing engine receives a second transaction information including a second rendered card information, the one or more look-up engines access BIN and rate information from the table based on the second transaction information, and the processing engine further calculates a second cost based on the BIN and rate table information and a second convenience fee for the second rendered card. Moreover, the processing engine (i) determines a second suggested card type based on an algorithm implemented by software such that the second suggested card type has a lower cost than the first cost and the second cost, and the second suggested card type has a lower convenience fee than the first convenience fee and the second convenience fee; and (ii) provides the second suggested card type to the user.

Also, the processing engine stores a subset of the first transaction information in the one or more storage devices as well as stores a subset of the second transaction information in the one or more storage devices. Further, the computer server accesses the first transaction information, and processes the first transaction information on a card network. In addition, the computer server may receive instructions from the user to select one of the rendered cards for the transaction, access the transaction information corresponding to the selected rendered card, and process the transaction information on a card network. Persons of ordinary skill in the art would understand from the disclosed embodiments that a user may render multiple cards (e.g. more than two) and the systems and methods. Moreover, the processing engine determining that a rendered card is on a blocking list stored by the computer server further blocking the processing of the rendered card.

Further, the transaction information is selected from the group consisting of payment information, payment amount, transaction type, merchant information, merchant type, merchant category, card information, card type, the card number, BIN, card expiration date, cardholder address, PIN, security code, asset size of the card issuer, and card networks of which the card issuer is a member. In addition, each suggested card type can be selected from the group consisting of a credit card, debit card, prepaid card, charge card, reward credit card, corporate credit card, rewards debit card, retailer credit card, and gift card.

Embodiments of the present disclosure include a method for managing a payment transaction. The method includes receiving, at a computer server, a first transaction information including a first rendered card information, payment amount, and merchant type, accessing BIN and rate information from a table, using the computer server, based on the first transaction information stored in a computer as well as calculating, using the computer server, a first cost based on the BIN and rate information and calculating a first incentive for the first rendered card. The method may also include determining a first suggested card type by the computer server based on an algorithm implemented by software such that the first suggested card type has a lower cost than the first cost and a larger incentive than the first incentive as well as providing the first suggested card type to the user.

Moreover, the method may include calculating a first suggested cost and a first suggested incentive for the first suggested card type as well as providing the first suggested incentive to the user. The first rendered card information is selected from the group consisting of a BIN or a card number. Further, the table having BIN and rate information is stored in one or more storage devices. The method may include storing a subset of the first transaction information by the computer server.

In addition, the method may include receiving, at a computer server, a second transaction information including a second rendered card information, accessing BIN and rate information from the table, using the computer server, based on the second transaction information as well as calculating, using the computer server, a second cost based on the BIN and rate table information and a second incentive for the second rendered card. Moreover, the method may include determining a second suggested card type by the computer server based on an algorithm implemented by software such that the second suggested card type has a lower cost than the first cost and the second cost and the second suggested card type has a larger incentive than the first incentive and the second incentive as well as providing the second suggested card type to the user.

Further, the method may include storing a subset of the first transaction information by the computer server as well as storing a subset of the second transaction information by the computer server. In addition, the method may include accessing the first transaction information, and processing the first transaction information on a card network. Moreover, the method may include receiving instructions from the user to select one of the rendered cards for the transaction, accessing the transaction information corresponding to the selected rendered card, and processing the transaction information on a card network. Persons of ordinary skill in the art would understand from the disclosed embodiments that a user may render multiple cards (e.g. more than two) and the systems and methods. Further, the method may include determining that a rendered card is on a blocking list stored by the computer server further blocking the processing of the rendered card.

Also, transaction information is selected from the group consisting of payment information, payment amount, transaction type, merchant information, merchant type and merchant category, and card information, card type, the card number, BIN, card expiration date, cardholder address, PIN, security code, asset size of the card issuer, and card networks of which the card issuer is a member. Further, each suggested card type can be selected from the group consisting of a credit card, debit card, prepaid card, charge card, reward credit card, corporate credit card, rewards debit card, retailer credit card, and gift card. In addition, each incentive can be selected from the group consisting of goods, coupons, charity, points, or third party incentives.

Embodiments of the disclosure include a system for managing a payment transaction. The system includes one or more processors, one or more storage devices, each coupled to the one or more processors, one or more communication interfaces coupled to the one or more processors and capable of being coupled to one or more communication networks. The system includes one or more software applications residing on the device, implemented by the one or more processors. The one of more software applications include a processing engine that receives a first transaction information including a first rendered card information, payment amount, and merchant type as well as one or more look up engines that (i) accesses BIN and rate information from a table based on the first transaction information stored in a computer; and (ii) passes the BIN and rate table information to the processing engine. Further, the processing engine further: (i) calculates a first cost based on the BIN and rate information and calculates a first incentive for the first rendered card; (ii) determines a first suggested card type based on an algorithm implemented by software such that the first suggested card type has a lower cost than the first cost and a larger incentive than the first incentive; (iii) provides the first suggested card type to a user. In addition, the processing engine calculates a first suggested cost and a first suggested incentive for the first suggested card type as well as the processing engine provides the first suggested incentive to the user. The first rendered card information is selected from a group consisting of a BIN or a card number. In addition, the table having BIN and rate information is stored in one or more storage devices. Also, the processing engine stores a subset of the first transaction information in the one or more storage devices. In addition, the processing engine receives a second transaction information including a second rendered card information, the one or more look-up engines access BIN and rate information from the table based on the second transaction information as well as the processing engine further calculates a second cost based on the BIN and rate table information and a second incentive for the second rendered card. Moreover, the processing engine (i) determines a second suggested card type based on an algorithm implemented by software such that the second suggested card type has a lower cost than the first cost and the second cost and the second suggested card type has a larger incentive than the first incentive and the second incentive; and (iii) provides the second suggested card type to the user.

In addition, the processing engine stores a subset of the first transaction information in the one or more storage devices as well as stores a subset of the second transaction information in the one or more storage devices. The computer server accesses the first transaction information, and processes the first transaction information on a card network. Further, the computer server receives instructions from the user to select one of the rendered cards for the transaction, accesses the transaction information corresponding to the selected rendered card, and processes the transaction information on a card network. Persons of ordinary skill in the art would understand from the disclosed embodiments that a user may render multiple cards (e.g. more than two) and the systems and methods. The processing engine determines that a rendered card is on a blocking list stored by the computer server further blocking the processing of the rendered card.

Transaction information is selected from the group consisting of payment information, payment amount, the transaction type, merchant information, merchant type, merchant category, and card information, card type, the card number, BIN, card expiration date, cardholder address, PIN, security code, asset size of the card issuer, and card networks of which the card issuer is a member. Each suggested card type can be selected from the group consisting of a credit card, debit card, prepaid card, charge card, reward credit card, corporate credit card, rewards debit card, retailer credit card, and gift card. Moreover, each incentive can be selected from the group consisting of goods, coupons, charity, points, or third party incentives.

The foregoing summary is illustrative only and is not intended to be in any way limiting. In addition to the illustrative aspects, embodiments, and features described above, further aspects, embodiments, and features will become apparent by reference to the drawings and the following detailed description

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION OF THE INVENTION

Figure 1A:
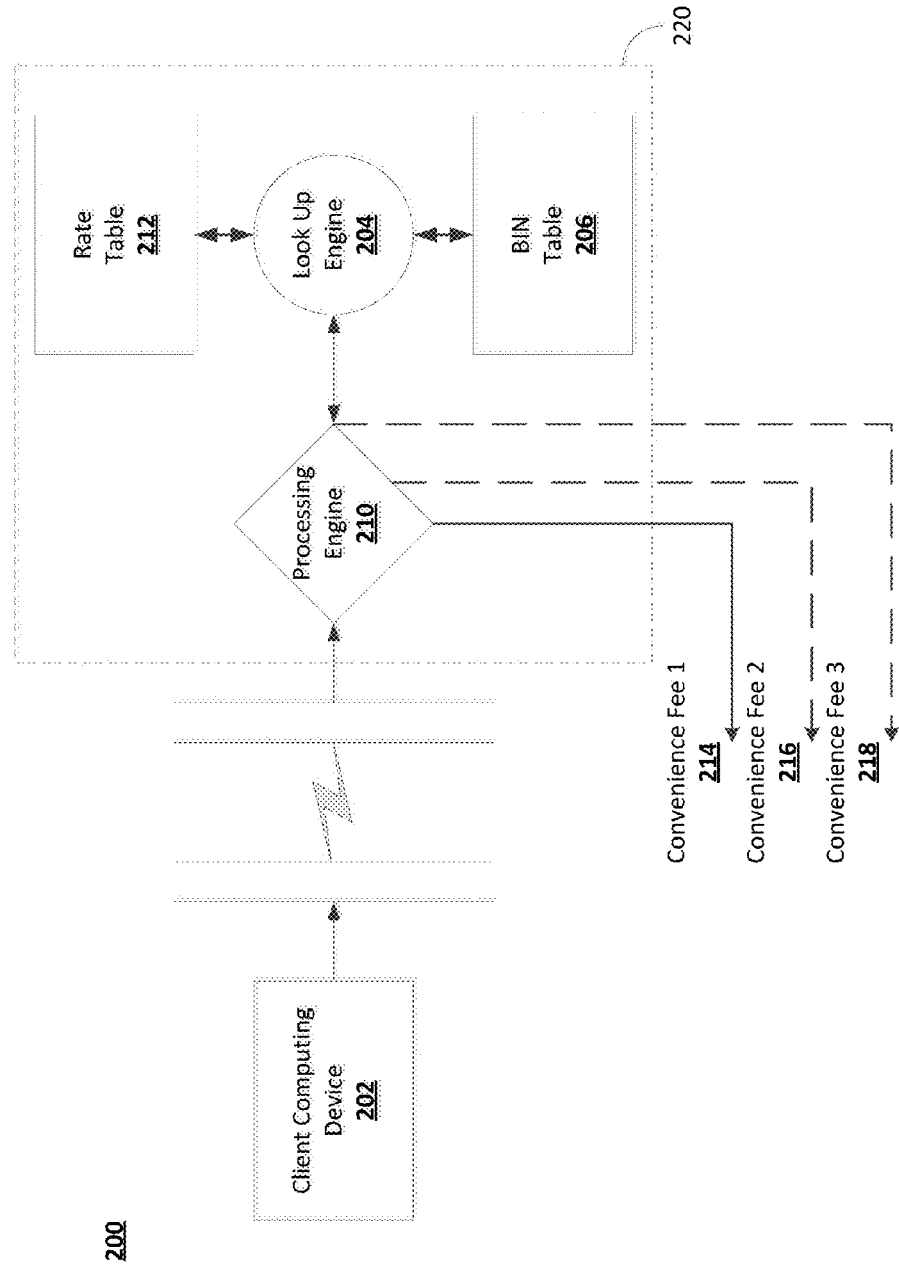
FIGS. 1A-3B are exemplary functional block diagrams of systems for managing payment transactions in accordance with embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

With the Durbin Amendment recently passed by Congress, debit interchange fees were significantly reduced for financial institutions with more than $10 Billion in assets (regulated). Further, issuers were obliged to enable their cards to be issued and processed by at least two unaffiliated debit networks such as Interlink and Star® or Star® and NYCE®, etc. This regulation enables merchants to competitively route debit transactions to the card network with the lowest fee to process its transactions. Thus, merchants may be able to provide lower convenience fees as well as incentives, and discounts to customers when they use a card with the lowest cost and hence benefit the merchant. Further, other factors affect the fees associated with a debit or credit card transaction thereby lowering the cost. Some factors may include, but are not limited to, card type (e.g. credit, debit, prepaid, business, reward etc.), size of financial institution that issued the card, network used to process payment, data captured when payment is rendered (e.g., cardholder address, PIN, etc.), type of merchant (utilities, car rental companies, etc.), and type of transaction (e.g. in person, single payment, recurring payment, Internet payment, etc.).

The factors adjust the fees associated with the credit card or debit card processing in different ways. For example, generally, fees for processing credit cards in a given card network are higher than fees for processing debit cards because of lower perceived risk of fraud to the issuers for debit cards. Based on the new Durbin amendment a debit card issued by a large financial institution, in most circumstances, has a lower interchange rate than a debit card issued by a small financial institution. A further factor in determining credit or debit card processing fees may be the type of network processing the card. The card type, size of financial institution issuing the card, and card network may be found by comparing the first several digits of the rendered card number with a Bank Identification Number (BIN) table.

Additional factors that affect credit or debit card processing cost may include the data captured when payment is rendered, the type of merchant, and the type of transaction. In most cases, the more data captured when payment is rendered (e.g. card expiration date, cardholder address, PIN, etc.) the lower the fees thereby reducing the cost. The reason for the lower cost is because the more cardholder information is gathered by the merchant, the less likely it is that a fraudulent transaction may occur. Another factor affecting the cost of a card transaction may be the type of merchant. For example, merchants who take payments from customers with whom they have an ongoing relationship (such as utilities, insurance companies, or cable TV providers) are charged lower interchange fees in many circumstances than merchants who take payments from customers that they do not know, or merchants who take payments for services for which the full price is not known at the time of the purchase (such as e-commerce transactions). The reason being is that there is more risk of fraud with a one-time payment transaction than with recurring payment transactions. In addition, the type of transaction, such as whether it is an in-person transaction, single payment, recurring payment, phone payment, or Internet payment would affect the card processing cost. Such interchange fees associated with data capture, merchant type, and transaction type can be found in one or more rate tables published by card networks.

An illustrative summary of some but all factors that may affects interchange fees, and are used in cost determination is shown in Table 1 below.

The exact factors that determine the cost of processing a payment from the card, the number of networks that are available to process a payment, and the structure of the BIN and rate tables published by each network are subject to change, due to regulation, card network pricing, competitive pressures and the introduction of new types of merchants. Other embodiments of the present disclosure fulfill a unique role by performing lookups in the most recent BIN tables and rate tables in real-time to determine a cost of the transaction before suggesting a convenience fee or incentive for each card payment transaction appropriate to that specific transaction.

FIGS. 1A-3B are exemplary functional block diagrams of systems for managing card payment transactions in accordance with embodiments of the present disclosure. Referring to FIG. 1A, the exemplary functional block diagram includes a client computing device 202, a look up engine 204, a BIN table 206, a processing engine 210, and a rate table 212. A client computing device 202 may be a tablet, notebook, laptop, or desktop computer as well as a landline phone, mobile phone, smartphone or any other client computing device such as a point-of-sale terminal. Embodiments of the disclosure may have the look-up engine 204 and the processing engine 210 on a server (e.g. merchant server, Facilitator server, etc.) and the client computing device may have a web browser as software or be a voice or CSR terminal. The server may alternatively be coupled to the client computing device through an application programming interface (API). In such a case the server receives card or transaction information from the client computing device through an API. The rate table may be multiple tables and but in the embodiment shown in

TABLE 1

| Factor | How does it affect Cost | How can fee be determined |
|---|---|---|
| The type of card that is used. Such as a Credit Card, Debit Card, combined Credit/Debit Card, ATM Card, or Prepaid Card. | Fees for processing credit cards are higher than fees for processing debit cards. | By looking up a subset of (typically 6) digits of the card number in a BIN Table, the system can determine the card type. |
| The size of the financial institution that issued the card. | Debit cards issued by large financial institutions have lower fees than debit cards issued by small financial institutions. | By looking up a subset of (typically 6) digits of a debit card number in a BIN Table the system can determine the size of the financial institution. |
| The network that is used to process the payment. Many cards allow processing via more than one network. | Different networks have different fees. | By looking up a subset of (typically 6) digits of a debit card number in a BIN Table the system can determine what networks can be used to process a payment from the card. |
| The data that is captured when the payment is taken. (e.g. card expiration date, cardholder address, PIN). | The more data is captured, the lower the cost. | Networks publish fee/rate tables that show what data is required to qualify for lower fees. |
| The type of merchant. | Merchants who take payments from customers with whom they have an ongoing relationship (such as utilities, insurance companies, or cable TV providers) are charged lower fees that Merchants who take payments from customers that they do not know, or merchants who take payments for services for which the full price is not known at the time of the purchase (such as car rental companies). | Each Merchant that is registered to receive payments has a Merchant Category Code or an Industry Classification code. Networks publish fee tables that show which merchants qualify for what fees. |
| The type of transaction (e.g. in person, single payment, recurring payment, phone payment, internet payment). | | Networks publish fee/rate tables that show which transaction types qualify for which fees. | the pending disclosure the rate table is shown as a singular table rather than a plurality of tables.

In the embodiment shown in FIG. 1, the look up engine 204, a BIN table 206, a processing engine 210, and a rate table 212 are on a server 220 such as a Facilitator (e.g. third party or vendor) server or a merchant server among others (e.g. a financial institution server). Persons of ordinary skill in the art would understand that further embodiments may not only include one server but a distributed system of servers that each implement a subset of the software applications discussed in the pending disclosure. A card holder may initiate a payment transaction by rendering a payment card (e.g. credit card, debit card, rewards card, prepaid debit card, gift card, etc.) using various means that include a software application on the client computing device 202 such as web browser. The look up software engine 204 may be implemented by a Facilitator server that receives the card information (e.g. card number or BIN number) and other transaction information (e.g. merchant information) to access information from the BIN table 206 and the rate table 212. Further, the look up software engine 204 may then process the information to determine the associated cost of the transaction (interchange fee, card network fee, processor fee among others) for the card rendered in the payment transaction. Thus, if the card is a credit card, then the look up table 204 may access a rate table 212 to determine the interchange fee and any other fee that may be associated with the payment transaction. Further, if the card is a debit card, the look up engine 204 may access a BIN table 206 to determine the cost associated with the debit card (or any other fee associated with the payment transaction). The BIN table 206 and rate tables 212 may be stored in a database or other storage device associated with the server 220. The look up engine 204 may then forward the determined or calculated cost (including the interchange fee, network fee, and processor fee) to the processing engine 210. Further, the processing engine 210 may implement one or more software applications incorporating algorithms to determine a convenience fee for the rendered card. As mentioned previously, the convenience fee is the fee charged to the consumer making the payment transaction for processing that payment transaction and is typically the sum of the cost of payment transaction and the profit associated with a payment transaction. The algorithms may incorporate other economic factors such as price elasticity, volume of card transactions, customer demand, day of the month, and other known factors in the art relevant to the transaction, implemented by the merchant server, Facilitator server and other servers in order to calculate the appropriate convenience fee for a transaction. Alternative embodiments include that the different algorithms calculate dynamically the convenience fee based on a discount from a static convenience fee. The static convenience fee may be determined by the factors mentioned above. For example a static convenience fee of $10 may be assessed and disclosed for all card transactions for a particular merchant. However, based on the implemented algorithm, when a reward credit card is rendered the system may suggest two alternate cards: (1) a conventional credit card with a discount of $2 from the static convenience fee, resulting an $8 convenience fee to the consumer/user; or (2) a debit card with a $6 discount from the static convenience fee resulting in a convenience fee of $4 to the consumer/user. In a further embodiment, the system may have more than one static convenience fee calculated and stored in the system based on the first card rendered. For example, if a reward credit card is rendered first a static convenience fee is calculated (e.g. $10) associated with that rewards credit card based on the implemented algorithm. All discounts henceforth for alternate or rendered cards will be calculated based on this ($10) convenience fee. Alternatively if convention credit card is rendered first a static convenience fee may be calculated (e.g. $7) associated with that conventional credit card based on the implemented algorithm. All discounts henceforth for alternate or rendered cards will be calculated based on the ($7) convenience fee.

In certain circumstance a surcharge rather than a discount may be assessed on a static convenience fee. This may apply if a card with higher interchange fee such as corporate cards is presented as well as for other reasons. The discount and surcharge calculation may be implemented to address card network regulation Further, the exemplary system 200 shown in FIGS. 1A-C may calculate a convenience fee for a card rendered by the customer such as a rewards credit card, for example, and then calculate a convenience fee for different types of cards such as a conventional credit card or a debit card. The cost for processing a debit card transaction is typically lower than for a rewards credit card or conventional credit card. Thus, the exemplary system 200 may suggest to the customer to render a conventional credit card or a debit card instead of a rewards credit card so has to incur a lower convenience fee. Further, the merchant may have access to more than one card networks to process a card for a payment transaction. Thus, the exemplary system 200 may calculate a cost of processing a debit card on the two different card networks and select the lower cost automatically and use this cost in calculating the convenience fee associated with the debit card.

For example, a customer may pay utility bill on a utility company's (merchant) website. Thus, the customer may use the web browser on the client computing device 202 to access the merchant website. Further, the customer may provide a rewards credit card number to the merchant website through the web browser that is received by the processing engine 210 of the Facilitator server 202. The processing engine 210 may instruct the look-up engine 204 to access information from the rate table 212 and BIN table for a credit card network and forward such information to the processing engine 210. Further, the processing engine 210 may determine the cost associated with rendered rewards credit card as well as a convenience fee 1 214 to offer the customer as shown in FIG. 1A. Further, the rewards credit card number or its BIN and other relevant transaction information are stored by the Facilitator server 202. In addition, the exemplary system 200 may suggest two other convenience fees (216 and 218) each associated with other cards (e.g. conventional credit card, and regulated debit card, etc.) that yield a lower convenience fee. The description of FIGS. 1B and 1C discuss the calculation of the other two convenience fees (216 and 218).

Figure 1B:
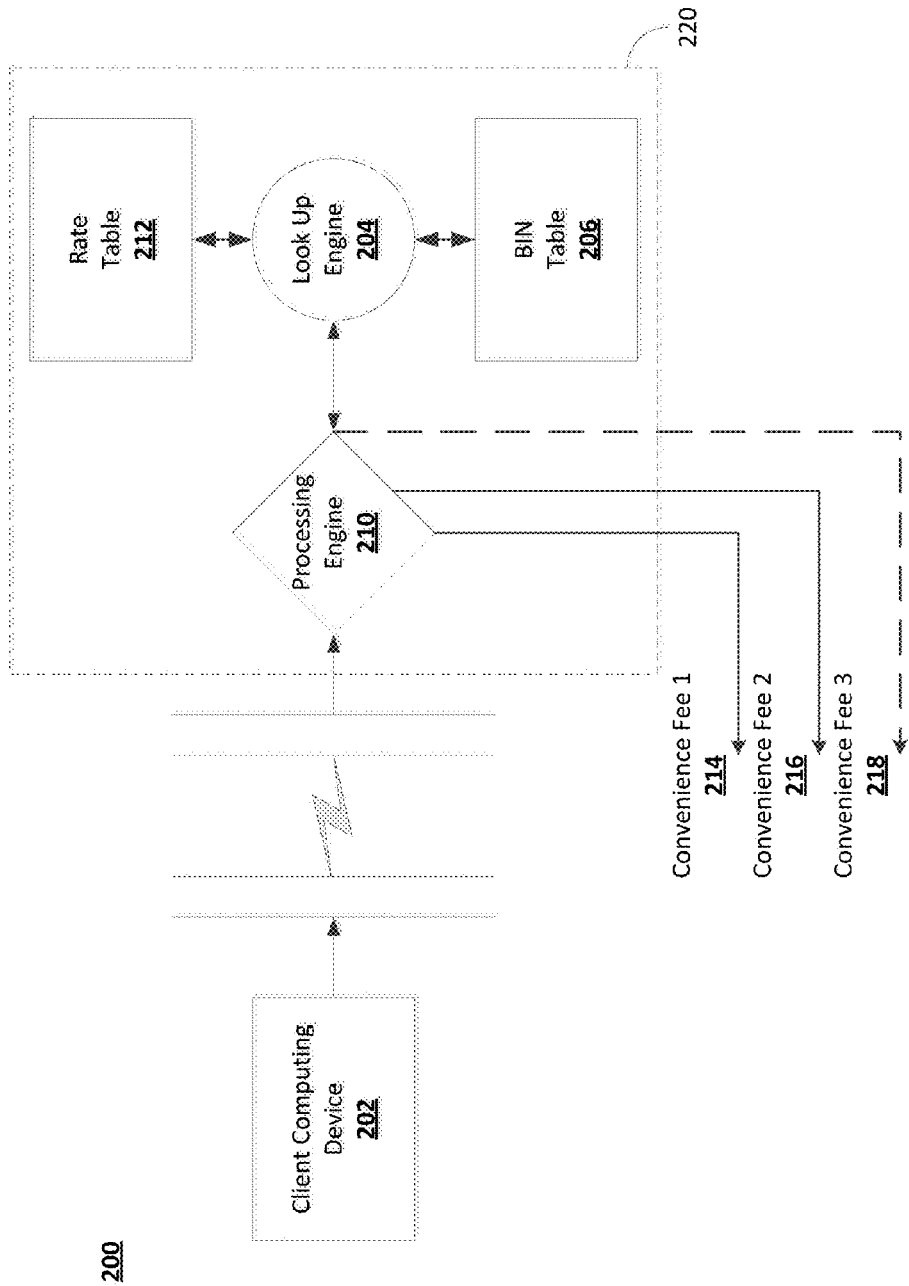

Referring to FIG. 1B, after determining convenience fee 1 (214) associated with a rendered rewards card, the processing engine 210, based on an algorithm, may instruct the look-up engine 204 to access information from the rate table 212 and BIN table for another card that the processing engine 210 deterministically expects to have a lower processing cost per algorithm such as a conventional credit card. The algorithm may take into account situations when a high cost card (e.g. rewards credit card) is rendered to calculate the convenience fee of lower cost cards such as conventional credit cards or debit cards. Consequently, the processing engine 210 may calculate transaction cost and then a convenience fee 2 (216) associated with processing a conventional credit card for the same purchase. Typically, the cost associated in processing a conventional credit card is lower than the cost of processing a rewards credit card. Thus, the convenience fee 2 (216) for a conventional credit card may be lower than the convenience fee 1 (214) associated with the rendered rewards credit card.

In certain embodiments, the exemplary system 200 may suggest a convenience fee 2 (216) to the customer through an API, a client computing device's web browser, or other means known in the art, as a less expensive alternative to convenience fee 1 (214). In such scenario system 200 may suggest the user to render a conventional credit card instead of a rewards credit card if they are in possession of such a conventional card to pay a lower fee of $4.95 rather than $7.95 for rewards credit card suggesting a saving of $3.

However, in some embodiments, a customer may not have or may not choose to render a suggested card after receiving the suggestions to use a different card that may yield a lower convenience fee 2 (216). Thus, the customer may render another, different type of card. The processing engine 210 may store second rendered card information and calculate the card's corresponding convenience fee. Further, the processing engine 210 may also calculate alternative convenience fees. For example, the processing engine 210, based on the algorithm may determine that if a customer rendered two different rewards credit cards that it may then calculate the rewards credit card having the lowest convenience fee and suggest such a rewards credit card as an alternative to the customer. Further, the processing engine 210 may suggest the previously suggested card having a lower convenience fee. The customer may then render a third card or select one of the previously rendered cards (information for which has been previously stored by the processing engine 210 in a storage device) to the process a current transaction.

Figure 1C:
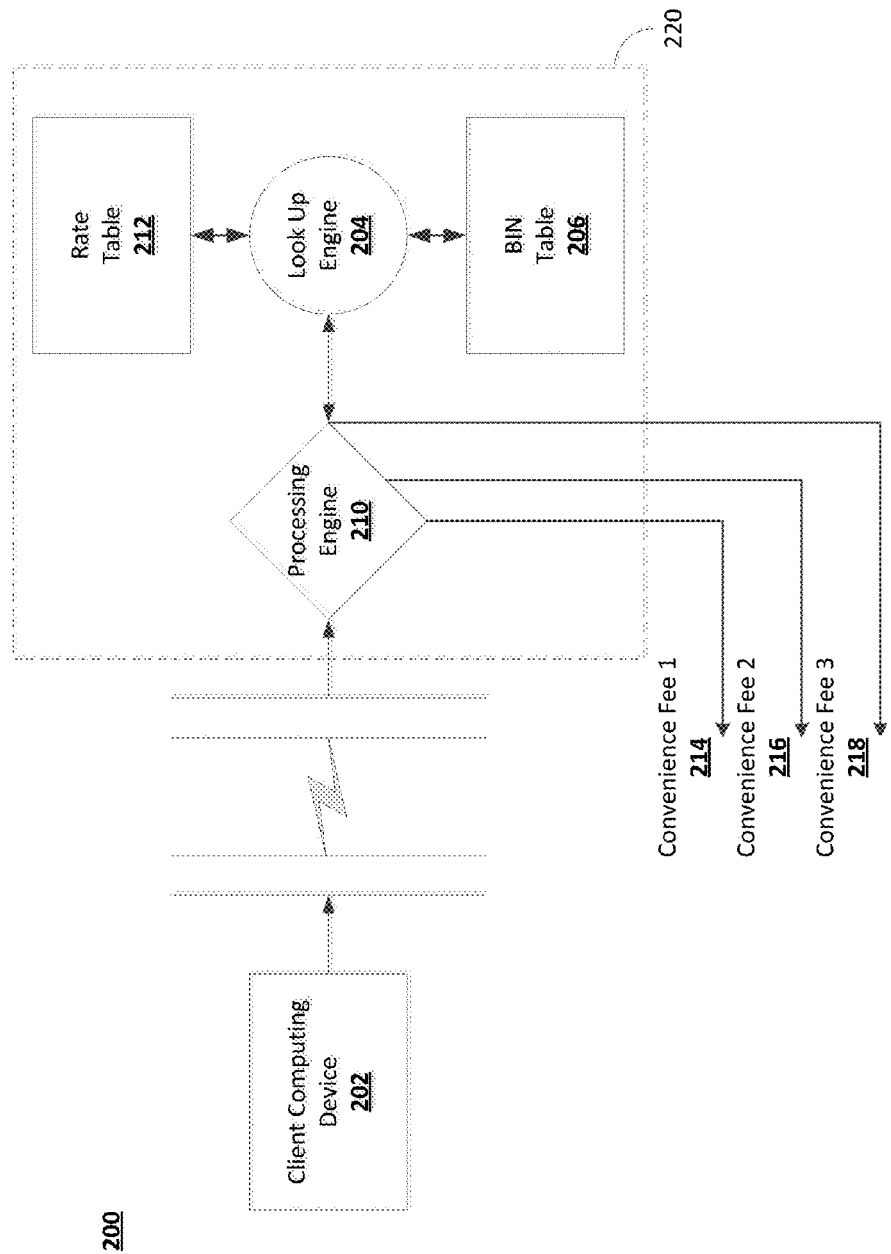

Referring to FIG. 1C, the processing engine 210 may determine the cost and convenience fee 3 (218) associated with a debit card. The look up engine 204 may access information pertaining to the payment transaction and calculate the cost of processing the payment transaction with a debit card rather than a rewards or conventional credit. The processing engine 210 calculates a convenience fee for processing the debit card for one or more debit card networks and selects the lower convenience fee (see convenience fee 3 218 in FIG. 1C) to be associated with a debit card. Such a convenience 3 (218) may be suggested to the customer through the client computing device web browser and other means described above or known in the art in addition to convenience 2 (216) associated with a conventional card and convenience 1 (214) associated with the rendered rewards credit card. Thus, the customer may select to render a conventional credit or a debit card, if either one is available, instead of the rewards credit card.

The calculation and suggestion of three convenience fees in FIGS. 1A-1C is exemplary and by no means limiting. Persons of ordinary skill in the art understand that the number of convenience fees calculated, and their associated cards suggested, may not be limited. Also, the examples and embodiments described in the pending disclosure may be combined, separated and rearranged as would be understood by those persons with ordinary skill in the art.

In another embodiment, prior to offering the various different convenience fees (214, 216, 218), the processing engine 210 may cause a query to the customer via the web browser, API, or other means known in the art to the client computing device 202 to request more information regarding the transaction such as PIN, card holder address, CVV code, etc. Based on the additional transaction information, the look-up engine 204 may access different information from the rate table 212 and BIN table 206. Such information may be passed to the processing engine 210 to determine a different cost and hence convenience fee (214, 216, and 218) for processing a customer's rewards credit card, conventional credit card, and/or debit card.

Additional embodiments may include the processing engine 210 determining the cost and convenience fee for a customer to render an automated clearing house (ACH) payment for a transaction. Prior to determining such ACH cost and associated convenience fee, the processing engine 210 may query the customer for additional information. Further such additional information may assist the processing engine 210 to determine the ACH cost and convenience fee. If the convenience fee is lower than the convenience fee associated with the rendered card, the processing engine may suggest ACH as an alternative method of payment.

It is possible that the system 200 may not suggest to render an alternative card to customer because savings due to the cost associated with any such alternative card is too small as compared to the initially rendered card (e.g. debit card) or other reasons based on algorithms stored in the system 200. In such an embodiment, the savings are not material in view of capturing the transaction in an efficient manner based on an algorithm and information stored by the merchant server or Facilitator server by the processing Engine 210. For example, algorithms could be configured such that if a convenience fee for a possible alternative card is determined to be less than 50 cents below the fee calculated for the rendered card, then the algorithm implemented by the processing engine 210 may prevent the processing engine 210 from suggesting such an alternative card to the customer.

Alternative embodiments may include that the system 200 in general, and processing engine 210 in particular, determine convenience fees for different types of cards (e.g. rewards credit card, conventional credit card, debit card) and suggest them to the customer after the customer is ready to pay for goods and services (such as in an e-commerce transaction) but before the customer renders any card for payment.

Other embodiments may include that the look up engine and/or processing engine may be implemented by the client computing device 202 (e.g. if the client computing device 202 is a POS terminal). Further, the BIN table and rate table are accessible by the client computer device 202 or by the Facilitator server 220 from a remote server or database.

In an alternative embodiment, the processing engine 210 may access a blocking list. Such a list may have a set of BINs that the system 200 may not accept for various reasons. For example, the cost for processing cards that belong to certain BINs may be high or for other reasons. Thus, if a card is rendered with such a blocked BIN, the processing engine 210 may provide feedback to the customer that the card cannot be processes for various reasons and suggest alternative cards for them to render with low convenience fees.

Figure 2A:
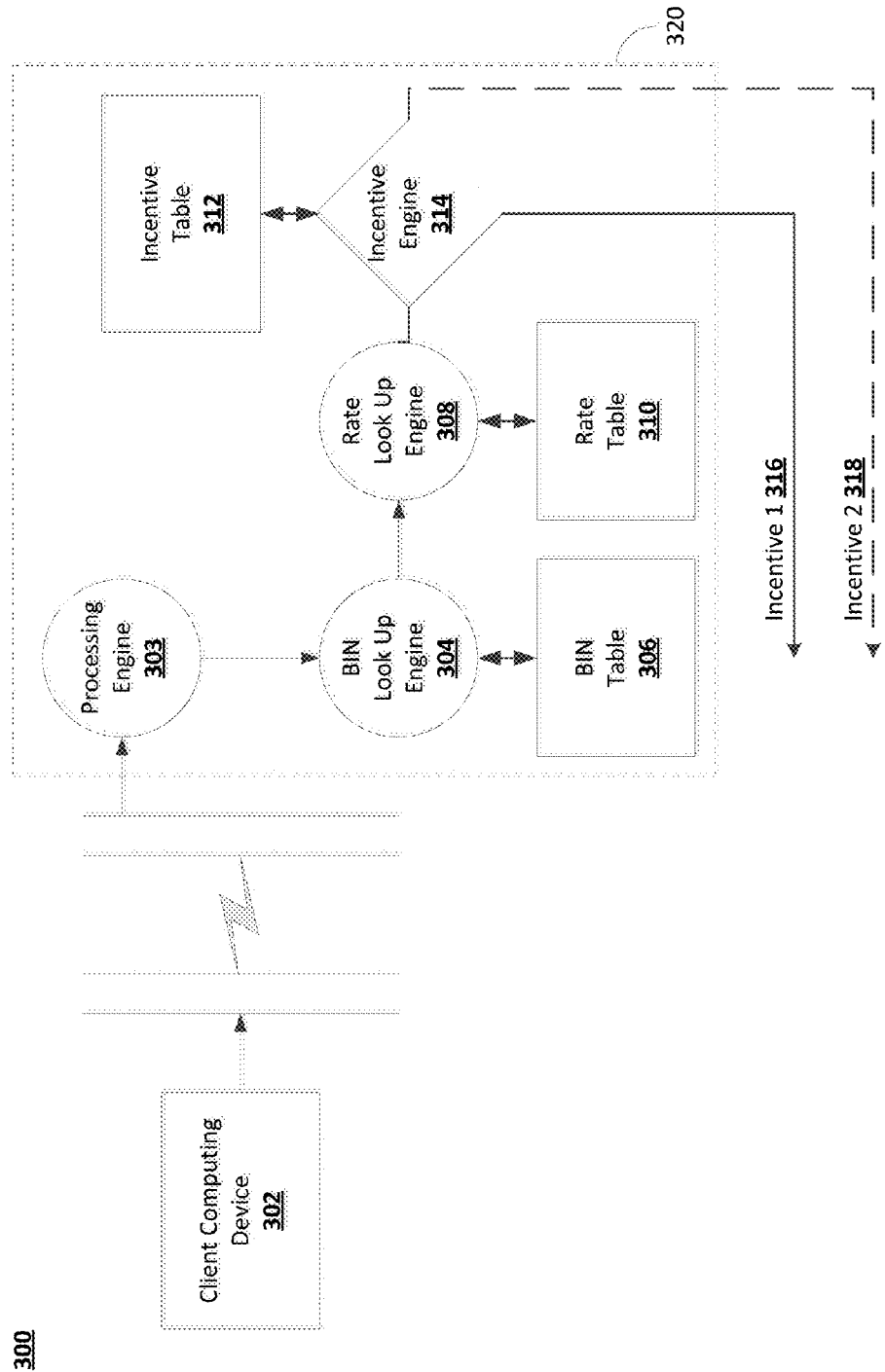

Referring to FIG. 2A, the exemplary functional block diagram includes a client computing device 302, a processing engine 303, a BIN look up engine 304, a BIN table 306, rate look up engine 308, a rate table 310, an incentive engine 314, and an incentive table 312. A client computing device 302 may be a tablet, notebook, laptop, or desktop computer as well as a landline phone, mobile phone, smartphone or any other client computing device such as a point-of-sale terminal. Alternative embodiments may have the look-up engine 304 and the processing engine 310 on a server (e.g. merchant server, Facilitator server, etc.) and the client computing device may have a web browser as software or be a voice or CSR terminal. The embodiment shown in FIG. 2A, the processing engine 303, a BIN look up engine 304, a BIN table 306, rate look up engine 308, a rate table 310, an incentive engine 314, and an incentive table 312 are on a Facilitator server. A card holder may initiate a payment transaction with a credit card or debit card using a software application on the client computing device 302. The processing engine 303 may be implemented by Facilitator server 320 that receives the transaction information (e.g. card number) from the client computing device through a web browser, API or other means known in the art and may cause the BIN look up software engine 304 and the rate look up engine 308 to access BIN table and rate table information. Further, the processing engine 303 may process the transaction information to determine the associated cost for processing the rendered card for the payment transaction. Note, persons of ordinary skill in the art would understand that comparing the embodiment shown in FIGS. 2A-B with the embodiment shown in FIGS. 1A-1C, the functionality incorporated in look up engine 204 in FIGS. 1A-1C, may be split between the BIN look up engine 304 and the rate lookup engine 308 in FIGS. 2A-2B. Moreover the BIN look up engine 304 may access a BIN table 306 and rate look up engine 308 may access a rate table 310 to determine the fees associated for the a card that may include the interchange fee, card network fee, and processor fee or any other fee that may be associated with the transaction. For example, a customer may access a utility company website such as a the website of a cellular phone service using a web browser, API, or other means known in the art through the client computing device 302. The customer may render a conventional card number to pay a cellular phone bill. The processing engine 303 receives the rendered conventional credit card number and transaction information then passes the rendered card number to BIN look-up engine 304 and the rate look-up engine 308. Further, the BIN look-up engine 304 and the rate look-up engine 308 access BIN and rate information from the BIN table 306 and rate table 310, respectively. Such BIN table and rate table information which may include the interchange fee, card network fee, processor fee or any other applicable fee may be forwarded to the incentive engine 314. The BIN table 306 and rate table 310 may be stored in a database or other storage device associated with the Facilitator server 320. In addition, the incentive engine 314 may calculate the cost of processing the rendered conventional credit card based on such BIN and rate table information. Also, using different algorithms based on price elasticity, volume of card transactions, customer demand, recurring nature of the transaction or other economic factors, the incentive engine 314 may determine an incentive 1 (316) corresponding to the rendered credit conventional card. Such incentive 1 (316) may also be listed and stored in the incentive table 312 to be used in future payment transactions. In addition, the processing engine 303 and/or the incentive engine 314 may determine an incentive 2 (318) associated with a different card (e.g. debit card) that may be more attractive to the customer and having a lower cost to the merchant. Such an alternative card may be suggested to customer through a client computing device web browser, API, or other known means in the art.

Figure 2B:
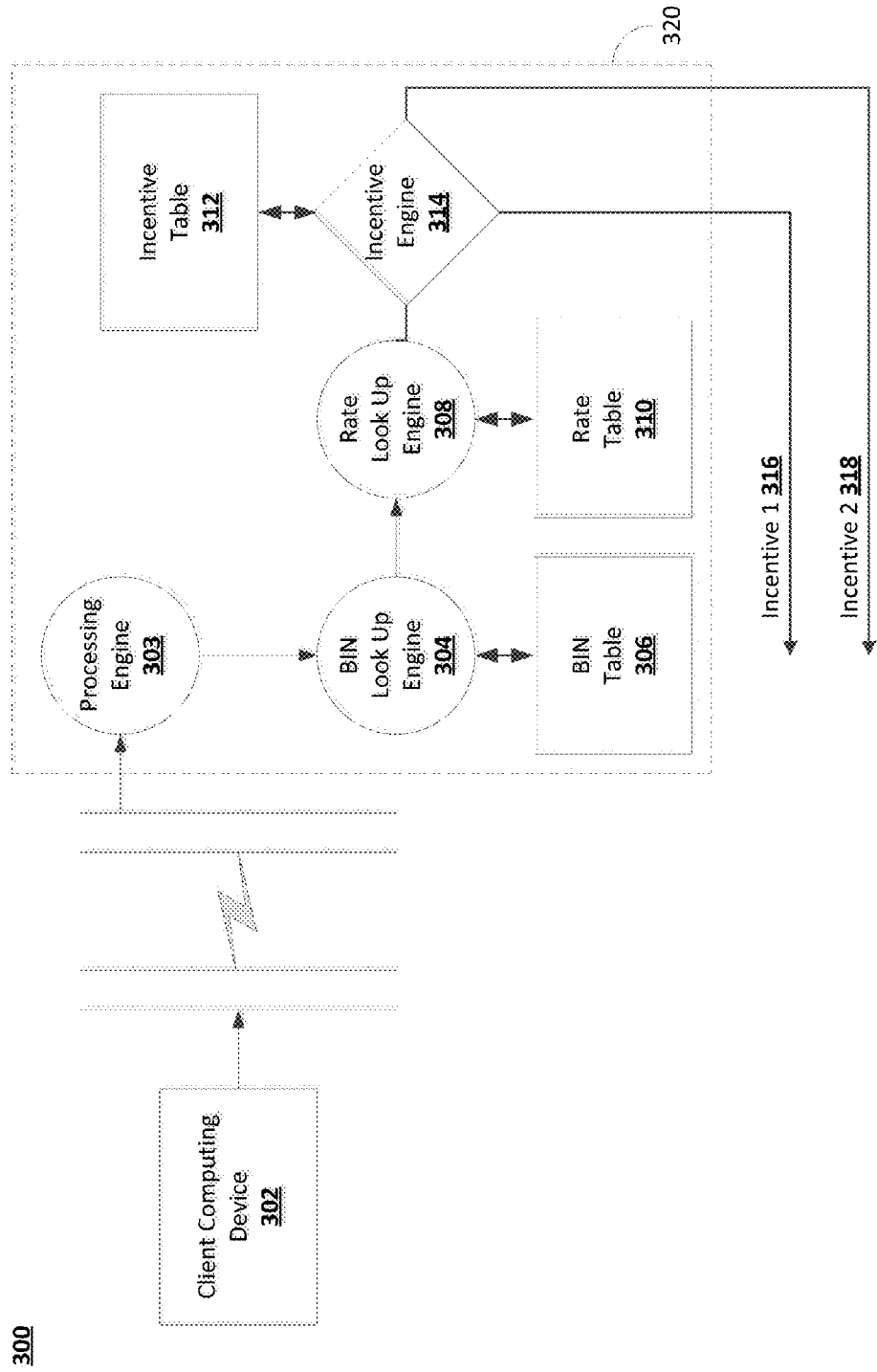

Referring to FIG. 2B, an algorithm executed by processing engine 303 may take into account situations when a high cost card (e.g. rewards credit card) is rendered to calculate the cost of lower cost cards such as conventional credit cards or debit cards to provide a better incentive. Consequently, the processing engine 303 causes the BIN look up engine 304 and rate look up engine 308 to access a BIN table 306 and rate table 310, respectively, to determine BIN and rate information including the fees (e.g. interchange fee, card network fee, processor fee) associated in processing the debit card. Further, due to the requirements of the Durbin legislation, the BIN and rate information may include fees for at least two different debit card processing networks. In addition, the BIN and rate information is forwarded to the incentive engine 314 which determines the cost for processing the debit card on each network (i.e. PIN-less debit vs. regular debit). After determining the lower cost, the incentive engine determines an incentive 2 (318) using different algorithms based on price elasticity, volume of card transactions, customer demand, recurring nature of the transaction or other economic factors. Typically, the cost associated with processing a debit card is lower than processing a conventional credit card. Thus, the incentive engine 314 and Facilitator server 320 may suggest to the customer to render a debit card corresponding to incentive 2 (318) instead of the conventional credit card corresponding to incentive 1 (316). Hence, incentive 2 (318) may be more attractive (i.e. increased) than incentive 1 (316) to entice a customer to render a debit card instead of a conventional credit card. For example, incentive 1 (316) may allow a customer to download 10 free ringtones from the cellular service provider's website. Alternatively, incentive 2 (318) may allow a customer to download 25 free ringtones. Other incentives in other embodiments may include $2 off your utility bill or $10 coupon on next purchase from merchant.

In alternate embodiments, prior to offering two different incentives (316 and 318), the processing engine 303 may cause a query to the user via the web browser of the client computing device 302 to request more information regarding the transaction such as PIN, card holder address, CVV code, etc. Such additional card information may be passed to the BIN look-up engine 304 and rate look-up engine to access different BIN and rate information that is provided to the incentive engine 314. Further, the incentive engine 314 may determine more attractive incentives (316 and 318) to suggest to the customer because, typically, the cost of processing cards is lower when more rendered information is collected from the customer.

Additional embodiments may include the incentive engine 314 determining the cost and incentive for a customer to render an automated clearing house (ACH) payment for a transaction. Prior determining such ACH cost and associated incentive, the processing engine 303/incentive engine 314 may query the customer for additional information. Further such additional information may assist the incentive engine 314 to determine the ACH cost and incentive. If the value of the incentive is lower than the value of the incentive associated with the rendered card, the incentive engine 314 may suggest ACH as an alternative method of payment. Persons of ordinary skill in the art understand that differences between the cost of process a payment from card and the corresponding offered incentives offered may not linear. For example, a rewards credit card may have a cost of $5 and offer no incentive, a conventional credit card may have a cost of $3 and have an incentive of a $1 discount, and a debit card may have a cost of $1 and have an incentive of a $3 discount. Such a nonlinear offering of incentives may motivate customers to choose to render the card with the lowest cost.

It is possible that the system 300 may not suggest to render an alternative card to customer because savings is too small (due to cost associated with processing the card) as compared to the initially rendered card (e.g. debit card). In such an embodiment, the savings are not material in view of capturing the transaction in an efficient manner based on algorithm and information stored by the merchant server or Facilitator server by the incentive engine 314. For example, algorithms could be configured such that if a value of an incentive for a possible alternative card is determined to be less than 50 cents than the value of the incentive of the rendered card, then the algorithm implemented by the incentive engine 314 may prevent the incentive engine 314 from suggesting such an alternative card to the customer.

Alternative embodiments may include that the system 300 in general, and incentive engine 314 in particular, to determine incentives for different types of cards (e.g. rewards credit card, conventional credit card, debit card) and suggest them to the customer after the customer is ready to pay for goods and services (such as in an e-commerce transaction) but before the customer renders any card for payment.

Other embodiments may include that the BIN table 306, rate table 310, incentive table 312 are stored and associated in one or more remote servers and are accessed by the Facilitator server 320. Further embodiments may include that the BIN and rate look up engines (304 and 308) and/or incentive engine 314 may be implemented by an entity other than the Facilitator such as a financial institution, merchant, or some other third party. Additional embodiments may include that the look up engines and/or processing engine may be implemented by the client computing device (e.g. POS terminal) and the BIN table, rate table and incentive table are accessible by the client computer device from a remote server (e.g. merchant server, Facilitator, and/or financial server). Persons of ordinary skill in the art would also understand that the incentive software engine 314 may be a type of processing engine as shown in FIGS. 1A-1C.

However, in some embodiments, a customer may not have or may not choose to render a conventional credit card after receiving the suggestions to use such a conventional credit card with a lower cost and hence a better incentive (318). Thus, the customer may render another, different card such as a different rewards credit card. The processing engine 303 may store second rendered card information and calculate the card's corresponding cost and incentive. Further, the processing engine 303 may also calculate alternative incentives. For example, the processing engine 303, based on the algorithm may determine that if a customer rendered two different rewards credit cards that it may then calculate the rewards credit card having the lowest cost and suggest such a rewards credit card as an alternative to the customer. Further, the processing engine 303 may suggest the previously suggested conventional credit having a lower cost and better incentive. The customer may then render a third card or select one of the previously rendered cards (information for which has been stored by the computer server) to the process a current transaction.

Although some embodiments disclose incentives as being goods (e.g. ringtones) or discounts (e.g. $5 off on a bill), persons of ordinary skill in the art would understand that incentives are not limited to goods and discounts but may also include, but not be limited to, coupons, payments to charity, reward points, and third party incentives etc. or any other type of incentive known in the art. Further, coupons include providing a discount on a future purchase of a good or service from a merchant. Alternatively, an incentive may include providing a payment to charity by the merchant if the customer uses a card with a lower cost. Moreover, an incentive may include reward points that may include airline points, card points (provided by a credit card company), retail points (provided by a merchant such as a hotel chain), etc. Third party incentives include, but are not limited to, one merchant offering a coupon or discount for a good or service offered by a third party merchant.

Figure 3A:
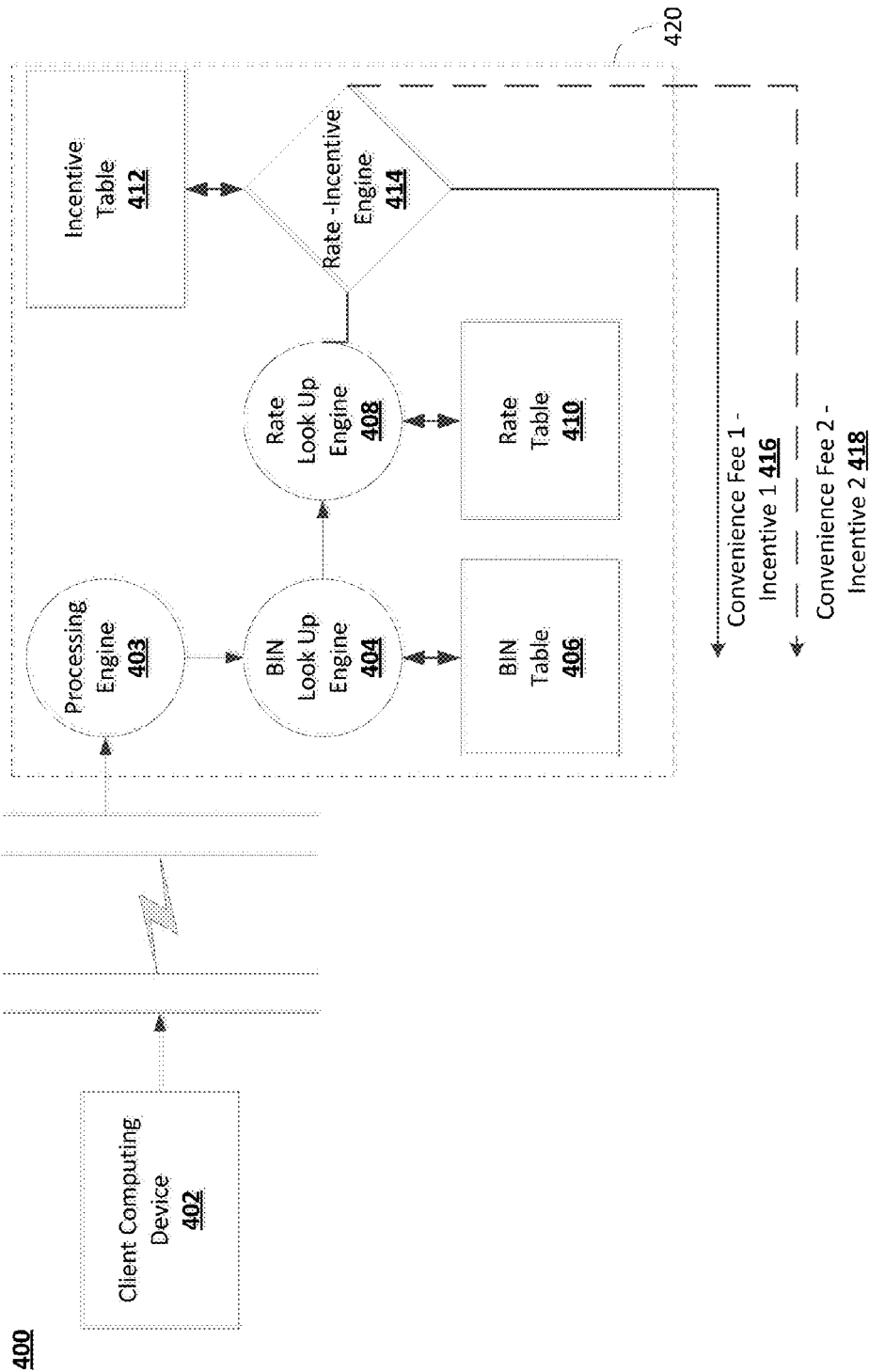

Referring to FIG. 3A, the exemplary functional block diagram includes a client computing device 402, a processing engine 403, a BIN look up engine 404, a BIN table 406, rate look up engine 408, a rate table 410, a rate-incentive engine 414, and an incentive table 412. A client computing device 402 may be a tablet, notebook, laptop, or desktop computer as well as a landline phone, mobile phone, smartphone or any other client computing device such as a point-of-sale terminal. Alternative embodiments may have the look-up engines (404 and 408) and the processing engine 403 on a server (e.g. merchant server, Facilitator server, etc.) and the client computing device 402 may have a web browser as software or be a voice or CSR terminal. The embodiment shown in FIG. 3A, the processing engine 403, a BIN look up engine 404, a BIN table 406, rate look up engine 408, a rate table 410, a rate-incentive engine 414, and an incentive table 412 are on a Facilitator server 420. A card holder may initiate a payment transaction by rendering a credit card or debit card using a software application on the client computing device 402. The processing engine 403 may be implemented by Facilitator server 420 that receives the transaction information (e.g. card number) from the client computing device through a web browser, API, or other means known in the art and may cause the BIN look up software engine 404 and the rate look up engine 408 to access BIN table and rate table information. Further, the processing engine 403 may process the transaction information to determine the associated cost for processing the rendered card for the payment transaction. Note, persons of ordinary skill in the art would understand that comparing the embodiment shown in FIGS. 3A-B with the embodiment shown in FIGS. 1A-1C, the functionality incorporated in look up engine 204 in FIGS. 1A-1C, may be split between the BIN look up engine 404 and the rate lookup engine 408 in FIGS. 3A-3B.

Moreover, if the customer renders a conventional credit card, then the BIN look up engine 404 may access a BIN table 406 and rate look up engine 408 may access a rate table 310 to determine the fees associated for the credit card that may include the interchange fee, card network fee, and processor fee or any other fee that may be associated with the transaction. For example, a customer may access a utility company website such a cellular phone service using a web browser on the client computing device 402. The customer may render a conventional card number to pay a cellular phone bill. The processing engine 403 receives the rendered conventional credit card number and transaction information then passes the rendered card number to BIN look-up engine 404 and the rate look-up engine 408. Further, the BIN look-up engine 404 and the rate look-up engine 408 access BIN and rate information from the BIN table 406 and rate table 410, respectively. Such BIN table and rate table information which may include the interchange fee, card network fee, processor fee or any other applicable fee may be forwarded to the rate-incentive engine 414. The BIN table 406 and rate table 410 may be stored in a database or other storage device associated with the Facilitator server 420. In addition, the rate-incentive engine 414 may calculate the cost of processing the rendered conventional credit card based on such BIN and rate table information. Also, using different algorithms based on price elasticity, volume of card transactions, customer demand, recurring nature of the transaction or other economic factors, the rate-incentive engine 414 may determine a convenience fee 1 and incentive 1 (416) corresponding to the rendered credit conventional card. Alternative embodiments include that the different algorithms calculate dynamically the convenience fee based on a discount from a static convenience fee. The static convenience fee may be determined by the factors mentioned above. Such incentive 1 (416) may also listed and stored in the incentive table 412 to be used in future payment transactions. In addition, the processing engine 403 and/or the rate-incentive engine 414 may determine a convenience fee 2 and incentive 2 (418) associated with a different card (e.g. debit card) that may be more attractive to the customer and having a lower cost to the merchant. Such an alternative card may be suggested to customer through a client computing device web browser, API, or other means known in the art to the customer.

Figure 3B:
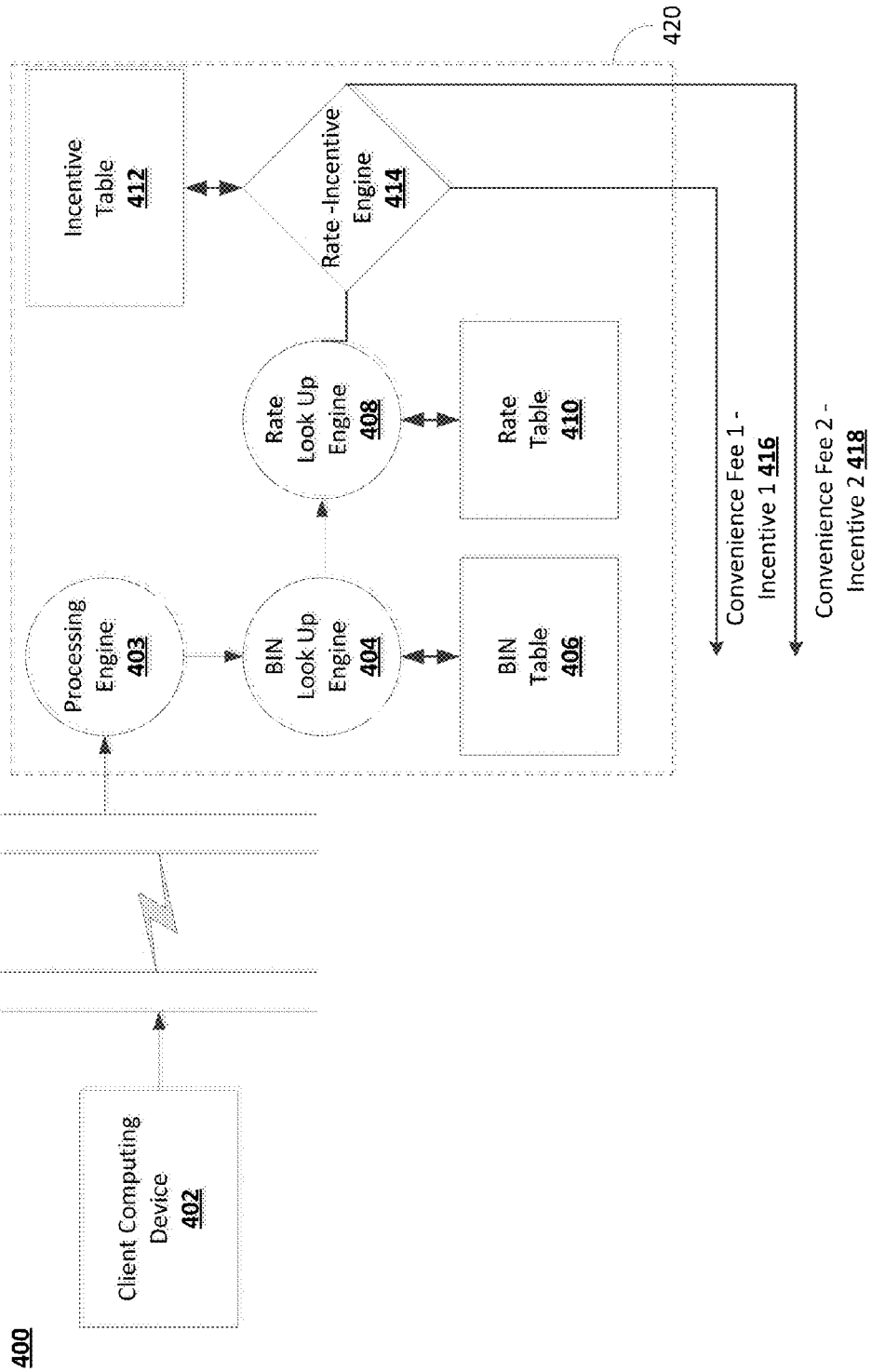

Referring to FIG. 3B, an algorithm executed by processing engine 403 may take into account situations when a high cost card (e.g. rewards credit card) is rendered to calculate the convenience fee of lower cost cards such as conventional credit cards or debit cards and also to provide a better (i.e. increased) incentive. Consequently, the processing engine 403 causes the BIN look up engine 404 and rate look up engine 408 to access a BIN table 406 and rate table 410, respectively, to determine BIN and rate information including the fees (e.g. interchange fee, card network fee, processor fee) associated in processing the debit card. Further, due to the requirements of the Durbin legislation, the BIN and rate information may include fees for at least two different debit card processing networks. In addition, the BIN and rate information is forwarded to the rate-incentive engine 414 which determines the cost for processing the debit card on each network. After determining the lower cost, the incentive engine determines an incentive 2 (418) using different algorithms based on price elasticity, volume of card transactions, customer demand, recurring nature of the transaction or other economic factors. Typically, the cost associated with processing a debit card is lower than processing a conventional credit card. Thus, the rate-incentive engine 414 and Facilitator server 420 may suggest to the customer to render a debit card corresponding to convenience fee 2 and incentive 2 (418) instead of the conventional credit card corresponding to incentive 1 (416). Hence, convenience fee 2 and incentive 2 (318) may be more attractive than convenience fee 1 and incentive 1 (316) to entice a customer to render a debit card instead of a conventional credit card. For example, convenience fee 1 may be $5 and incentive 1 (316) may allow a customer to download 10 free ringtones from the cellular service provider's website. Alternatively, convenience fee 2 may be $2 and incentive 2 (318) may allow a customer to download 25 free ringtones.

In alternate embodiments, prior to offering two different convenience fees and incentives (416 and 418), the processing engine 403 may cause a query to the user via the web browser of the client computing device 402 to request more information regarding the transaction such as PIN, card holder address, CVV code, etc. Such additional card information may be passed to the BIN look-up engine 404 and rate look-up engine 408 to access different BIN and rate information that is provided to the incentive engine 414. Further, the rate-incentive engine 414 may determine more attractive convenience fees and incentives (416 and 418) to suggest to the customer because, typically, the cost of processing cards is lower when more rendered information is collected from the customer.

Other embodiments may include that the BIN table 406, rate table 410, incentive table 412 are stored and associated in one or more remote servers and are accessed by the Facilitator server 420. Further embodiments may include that the BIN and rate look up engines (404 and 408) and/or incentive engine 414 may be implemented by an entity other than the Facilitator such as a financial institution, merchant, or some other third party. Additional embodiments may include that the look up engines and/or processing engine may be implemented by the client computing device (e.g. POS terminal) and the BIN table, rate table and incentive table are accessible by the client computer device from a remote server (e.g. merchant server, Facilitator, and/or financial server). Persons of ordinary skill in the art would also understand that the rate-incentive software engine 414 may be a type of processing engine as shown in FIGS. 1A-1C.

However, in some embodiments, a customer may not have or may not choose to render a conventional credit card after receiving the suggestions to use such a conventional credit card with a lower cost and hence a better convenience fee—incentive (318). Thus, the customer may render another, different card such a different rewards credit card. The processing engine 403 may store second rendered card information and calculate the card's corresponding cost and incentive. Further, the processing engine 403 may also calculate alternative incentives. For example, the processing engine 403, based on the algorithm may determine that if a customer rendered two different rewards credit cards that it may then calculate the rewards credit card having the lowest cost and suggest such a rewards credit card as an alternative to the customer. Further, the processing engine 403 may suggest the previously suggested conventional credit having a lower cost and better incentive. The customer may then render a third card or select one of the previously rendered cards (information of which was stored by the computer server) to the process a current transaction.

Alternative embodiments with respect to the disclosure including those illustrated in FIGS. 1-3 may include providing alternatives or incentives to prompt the user to provide an alternative credit card or use an online payment processing system (e.g. PayPal) instead of the first credit card the user provided. The following examples illustrate aspects of the present disclosure. A first example may include a merchant taking bill payments via the Internet and/or phone. The merchant may be an insurance company qualifying the merchant for processing debit card payments using the EFT Network. Further, an insured uses the merchant's website to pay a premium on a car policy. The insured may enter a Visa card number such that the system receives the following information: Payment Amount: $300.00; Payment Type: One Time Bill Payment; Merchant Type: Insurance; and Card Number: 3456781234567890. An exemplary system looks up the first 6 digits of the card number in a BIN table (345678) determines that it is a debit card issued by a large financial institution, and that the card can be processed through the Visa Network and the NYCE EFT Network. In addition, the exemplary system looks up the fees for a One Time Bill Payment of $300.00 through both networks and determines that the Visa Network results in a fee of $0.23, if the all data is present to qualify for the lowest rate on the Visa Network, which includes an Invoice Number and the cardholder address. Alternatively, the NYCE EFT Network results in a fee of $0.70. The system determines that (1) the lowest fee is achieved by processing the payment through the Visa Network, (2) a lower fee cannot be achieved with any other card type, (3) the Visa Network requires that the cardholder provides an address. The system also uses the merchant-specific fee tables and selects a convenience fee of $2.50. Consequently, the merchant uses this information to process the payment through the Visa Network, and charge the cardholder a $2.50 convenience fee, and prompts the cardholder for the cardholder address.

In another example, an insured may use the merchant's phone-based system to pay a premium on a car policy. The insured may enter a Visa Card Number and other information such that an exemplary system receives the following information: Payment Amount: $300.00; Payment Type: One Time Bill Payment; Merchant Type: Insurance; and Card Number: 2345671234567890. Further, the exemplary system looks up the first 6 digits of the card number in a BIN table (234567) and determines that the card is a debit card issued by a small institution and that the card can be processed through the Visa Network and the NYCE EFT Network. In addition, the exemplary system looks up the fees for a One Time Bill Payment of $300.00 through both networks and determines that the NYCE EFT Network results in a cost of $0.70 and that the Visa Network results in a fee of $4.75. The system determines that (1) the lowest fee is achieved by processing the payment through the NYCE EFT Network, (2) a lower fee cannot be achieved with any other card type, (3) the NYCE EFT Network does not require any additional information. The system also uses the merchant-specific fee tables and selects a convenience fee of $2.90. The merchant uses this information to process the payment through the NYCE EFT Network and charge the cardholder a fee of $2.90.

In a further example, an insured uses the merchant's website to pay a premium on a car policy. The insured enters a Visa Card Number and the exemplary system receives the following information: Payment Amount: $300.00; Payment Type: One Time Bill Payment; Merchant Type: Insurance; Card Number: 1234567890123456. In addition, the exemplary system looks up the first 6 digits of the card (123456) number in a BIN table and determines that the card is a rewards credit card issued by a large financial institution, and that the card can only be processed through the Visa Network (card processing network). Further, the exemplary system looks up the fees for a One Time Bill Payment of $300.00 through the Visa Network results in a cost of $6.00. The system determines that (1) the lowest fee is achieved by processing the payment through the Visa Network, (2) a lower fee can be achieved with a debit card type, (3) the Visa Network does not require any additional information. The system also uses the merchant-specific fee tables and selects a convenience fee of $10.00. The merchant uses this information to offer the cardholder a fee of $10.00, and suggests that the cardholder can lower this fee by using a debit card or an alternate credit card without rewards.

In an additional example, a merchant takes bill payments via the Internet. The merchant is an Internet service provider company qualifying the merchant for processing debit card payments using the EFT Networks. A subscriber uses the merchant's website to pay a monthly bill. Further, the subscriber enters a MasterCard Card Number. The exemplary system receives the following information: Payment Amount: $47.50; Payment Type: One Time Bill Payment; Merchant Type: Internet Service Provider; Card Number: 5333331234567890. The exemplary system looks up the first 6 digits of the card number (533333) in a BIN table and determines that the card is a debit card issued by a large financial institution and that the card can be processed through the MasterCard Network and the STAR EFT Network.

Thereafter, the system may lookup up the fees for a One Time Bill Payment of $47.50 through both networks and determines that the MasterCard Network results in a fee of $0.23, if the all data is present to qualify for the lowest rate on the MasterCard Network, which includes an Invoice Number and the cardholder address, and that the STAR Network results in a fee of $0.57. The system determines that (1) the lowest fee is achieved by processing the payment through the MasterCard Network, (2) a lower fee cannot be achieved with any other card type, (3) the MasterCard Network does not require any additional information. The system also uses the merchant-incentive tables and selects an incentive of 1 free music or game download. Consequently, the merchant uses this information to process the payment through the Master-Card Network and offer the cardholder a coupon for a free music or game download if they make a one-time payment, or 10 free downloads if they setup a recurring payment.

In a further example, an Internet Service subscriber uses the merchant's website pay their monthly bill. The subscriber enters a MasterCard Card Number and the exemplary system receives the following information: Payment Amount: $47.50; Payment Type: One Time Bill Payment; Merchant Type: Internet Service Provider; and Card Number: 5666661234567890. The exemplary system looks up the first 6 digits of the card number (566666) in a BIN table and determines that card is a Rewards Credit Card issued by a large financial, and that the card can be only processed through the MasterCard Network. The exemplary system lookup up the fees for a One Time Bill Payment of $47.50 through the MasterCard Network results in a cost of $1.00. The system determines that (1) the lowest fee is achieved by processing the payment through the MasterCard, (2) a lower fee can be achieved with a debit card, (3) the MasterCard Network does not require any additional information. The system also uses the merchant-incentive tables and selects no incentive. The merchant uses this information to suggest to the cardholder that they can receive free game/music downloads if they pay with a debit card rather than a credit card.

Figure 4:
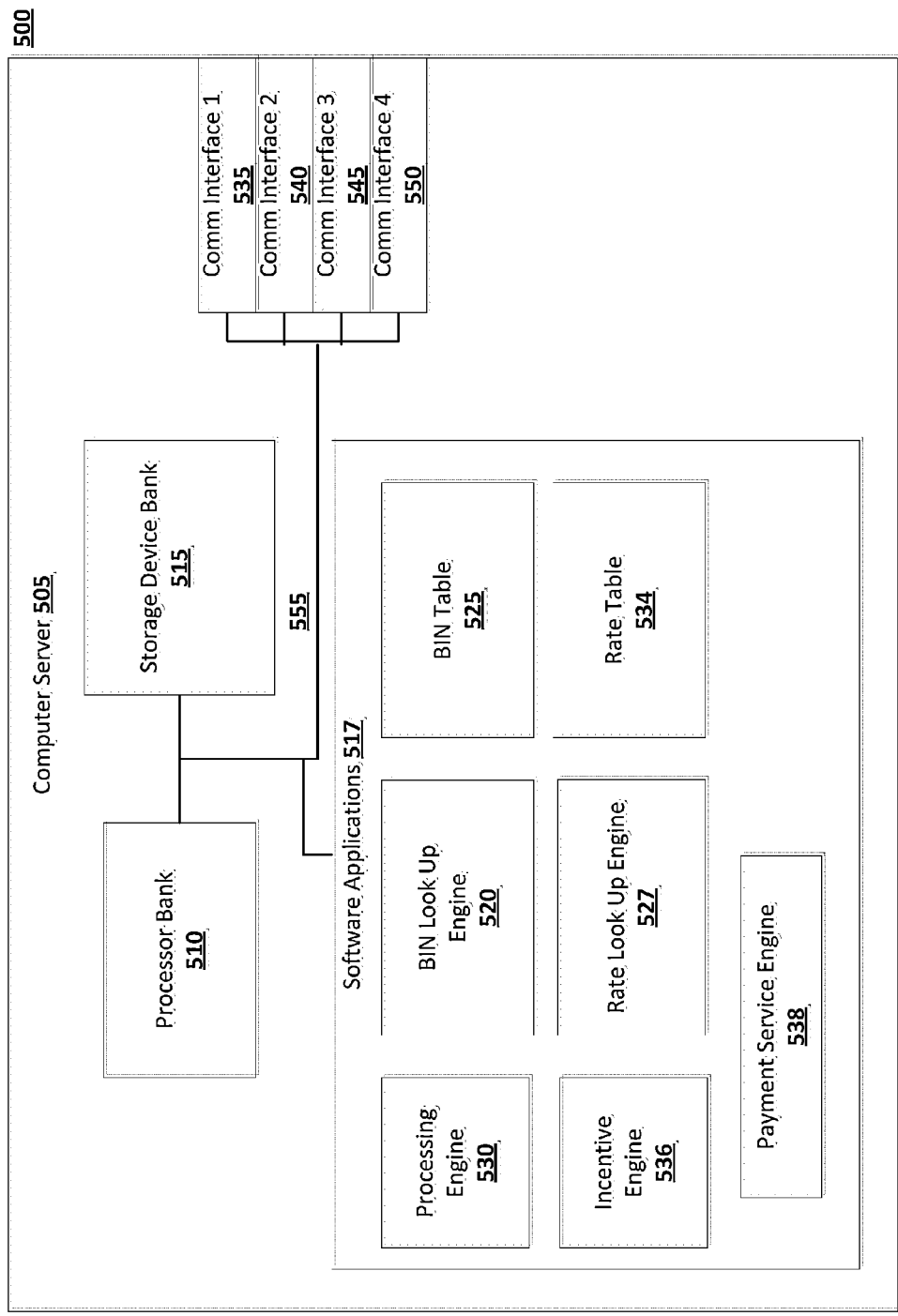
FIG. 4 is an exemplary device for managing a payment transaction in accordance with embodiments of the present disclosure.

FIG. 4 is an exemplary device 500 for managing a payment transaction in accordance with embodiments of the present disclosure. The device 500 may be a computer server 505 such as the merchant computer server, Facilitator computer server, and financial institution computer server. The computer server 505 may include several different components such as a processor bank 510, storage device bank 515, one or more software applications 517, and one or more communication interfaces (535-550). The processor bank 510 may include one or more processors that may be co-located with each other or may be located in different parts of the computer server 505. The storage device bank 515 may include one or more storage devices. Types of storage devices may include memory devices, electronic memory, optical memory, and removable storage media. The one or more software applications 517 may include a BIN Look up Engine 520, BIN Table 525, Rate Table 534, processing engine 530, and Rate Look up Engine 527 as well as additional software applications (not shown). The additional software applications may implement software functions that assist in performing certain tasks for the computer server 505 such as providing access to a communication network, executing an operating system, managing software drivers for peripheral components, and processing information. Additional software applications may also include software drivers for peripheral components, user interface computer programs, debugging and troubleshooting software tools.

The processing engine 530 may control and/or implement one or more software applications as well as receive and transmit data from the one or more communication interfaces (535-550). For example, the computer server 505 may receive a credit or debit card number as well as payment transaction information from a client computing device or point-of-sale (POS) terminal. The processing engine 530 may receive the credit or debit card number and payment transaction information from one of the communication interfaces (535-550) as well as an API and forwards such credit or debit card number and payment transaction information to the BIN look up engine 520. Upon receiving the credit or debit card number and payment transaction information, the BIN look up engine discerns the bank identification number (BIN) from the first six digits of the credit or debit card and consults a BIN table 525 to determine the card type (e.g. credit, debit, prepaid, etc.), issuing financial institution for the card, and a network for processing the card. In some embodiments more than one processing network may be available for a card (e.g. debit card). Based on the card type, issuing financial institution, and processing network the BIN look up engine 520 may determine one or more fees for processing the rendered card and forward such fees to the processing engine 530. Further, based on the rendered card and transaction information, processing engine 530 may cause the rate look up engine 527 to consult a rate table 534 to determine additional rates/fees for the processing the rendered card. The rate look up engine 527 may forward the additional rates/fees to the processing engine 530. The fees determined from the BIN and rate table information may include the interchange fee, card network fee, and processor fee. The processing engine 530 may determine the cost of processing the rendered card based on the interchange fee, card network fee, and processor fee. Further, the processing engine 530 may determine a convenience fee using different algorithms based on price elasticity, volume of card transactions, customer demand, recurring nature of the transaction or other economic factors. Alternatively or in addition, the incentive engine 536 may determine an incentive to the customer based on the cost of the processing the rendered card using different algorithms based on price elasticity, volume of card transactions, customer demand, recurring nature of the transaction or other economic factors. Moreover, the cost associated in processing a debit card is typically lower than the cost of processing a credit card. Thus, if the rendered card was a credit card, the computer server 505 may suggest to the customer to use a debit card having a lower convenience fee. As a result, the processing engine may cause the BIN look up engine 520 and rate look up engine 527 to access BIN and rate table information for a debit card. Further, due to the Durbin legislation, the BIN and rate table information for two different debit card processing networks may be provided. The processing engine 530 determines the cost of processing a debit card on the different debit card processing networks and selects the lower cost. In addition, the processing engine 530 determines a convenience fee based on the cost as well as using different algorithms based on price elasticity, volume of card transactions, customer demand, recurring nature of the transaction or other economic factors. Also, the incentive engine 536 may determine an incentive based on the cost of processing the debit card as well as using different algorithms based on price elasticity, volume of card transactions, customer demand, recurring nature of the transaction or other economic factors. Alternative embodiments include that the different algorithms calculate dynamically the convenience fee based on a discount from a static convenience fee. The static convenience fee may be determined by the factors mentioned above. As a result, the computer server 505 may suggest a convenience fee and/or incentive corresponding to a debit card.

In addition, prior to determining the cost of processing a rendered card, the processing engine 530 may request then receive other card and cardholder information such as the expiration date, security code, cardholder address, or PIN as well as the merchant type and transaction type. The processing engine may then cause the BIN look up engine 520 and the rate look up engine 527 to access different BIN and rate table information that provides a lower cost for processing the rendered card.

Further, the computer server 505 may include a payment service engine 538 that can access a service fee table (not shown) and determine one or more service fees based on the rendered card and transaction information and the service fee table. The service table is generated based on one or more bank identification tables and one or more rate tables and the service fee table are capable of being configured by a merchant.

Each of the communication interfaces (535-550) shown in FIG. 4 may be software or hardware associated in communicating to other devices. The communication interfaces (535-550) may be of different types that include an API, a user interface, USB, Ethernet, WiFi, WiMax, wireless, optical, cellular, voice (IVR), or any other communication interface coupled to communication network.

An intra-device communication link 555 between the processor bank 510, storage device bank 515, software applications 517, and communication interfaces (535-550) may be one of several types that include a bus or other communication mechanism.

Persons of ordinary skill in the art would understand that some of the components of the computer server 505 shown in FIG. 4 may be split between one or more computer servers such as between a merchant server and a Facilitator server or a financial institution server, or a subset thereof. Further, although embodiments in the present disclosure use the BIN to be the first six digits of a rendered card number, persons of ordinary skill in the art would understand that the BIN could be more or less than 6 digits.

Figure 5:
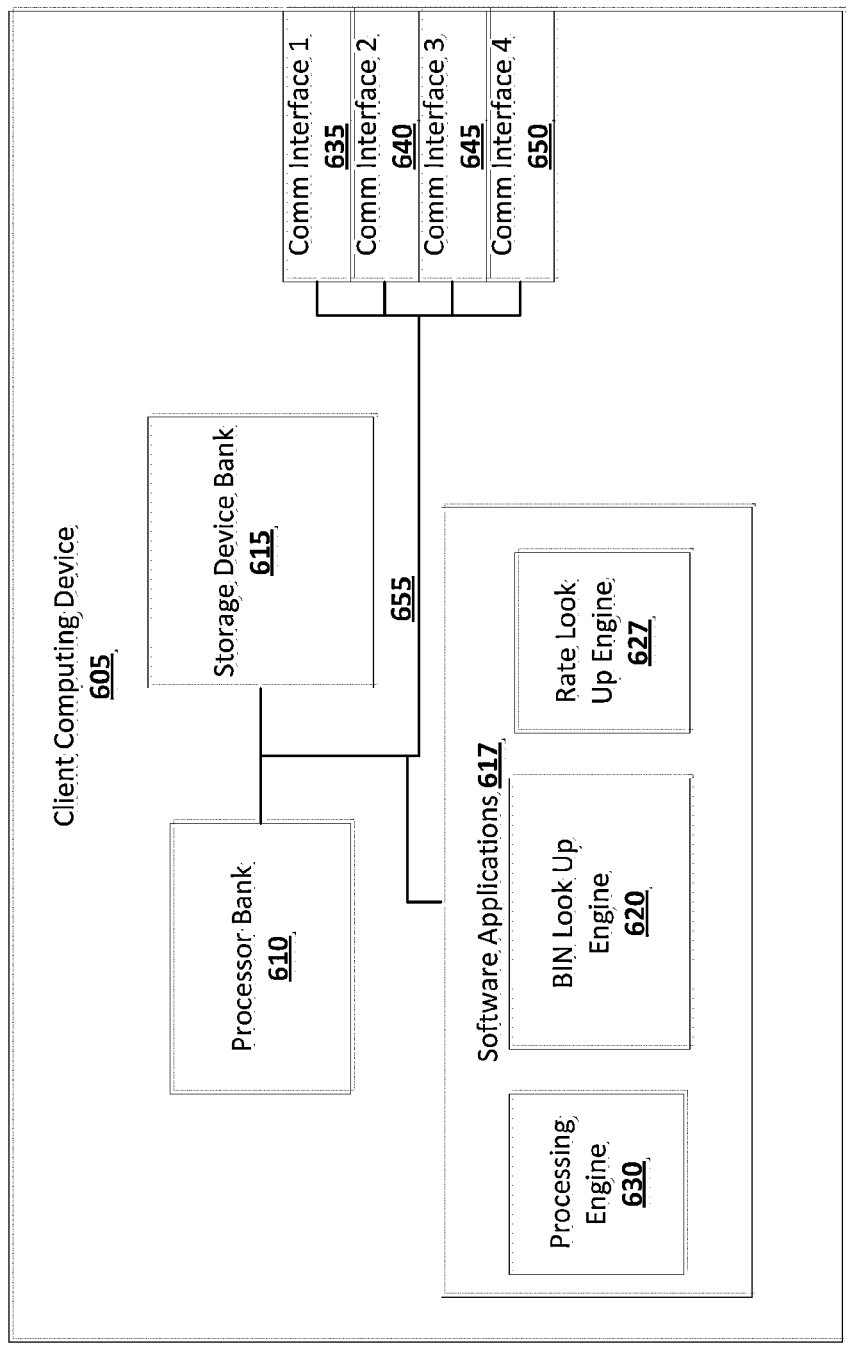
FIG. 5 is another exemplary device for managing a payment transaction in accordance with embodiments of the present disclosure.

FIG. 5 is another exemplary device 600 for managing payment transaction fees in accordance with embodiments of the present disclosure. The device 600 may be a client computing device 605 such as a POS terminal. The client computing device 605 may include several different components such as a processor bank 610, storage device bank 615, one or more software applications 617, and one or more communication interfaces (635-650). The processor bank 610 may include one or more processors that may be co-located with each other or may be located in different parts of the client computing device 605. The storage device bank 615 may include one or more storage devices. Types of storage devices may include memory devices, electronic memory, optical memory, and removable storage media. The one or more software applications 617 may include a BIN Look up Engine 320, processing engine 630, and Rate Look up Engine 627 as well as additional software applications (not shown). The additional software applications may implement software functions that assist in performing certain tasks for the client computing device 605 such as providing access to a communication network, executing an operating system, managing software drivers for peripheral components, and processing information. Additional software applications may also include software drivers for peripheral components, user interface computer programs, debugging and troubleshooting software tools.

The processing engine 630 may control and/or implement one or more software applications as well as receive and transmit data from the one or more communication interfaces (635-650). For example, the client computing device 605 may receive a credit or debit card number as well as payment transaction information from a customer through a user interface. The processing engine 630 may forward such credit or debit card number and payment transaction information to the BIN look up engine 620. Upon receiving the credit or debit card number and payment transaction information, the BIN look up engine 620 discerns the bank identification number (BIN) from the first six digits of the credit or debit card and consults a BIN table to determine the card type (e.g. credit, debit, prepaid, etc.), issuing financial institution for the card, and a network for processing the card. In some embodiments more than one processing network may be available for a card (e.g. debit card). Based on the card type, issuing financial institution, and processing network the BIN look up engine 620 may determine one or more fees for processing the rendered card and forward such fees to the processing engine 630. Further, based on the rendered card and transaction information, processing engine 630 may cause the rate look up engine 627 to consult a rate table to determine additional rates/fees for the processing the rendered card. The rate look up engine 627 may forward the additional rates/fees to the processing engine 630. The fees determined from the BIN and rate table information may include the interchange fee, card network fee, and processor fee. The processing engine 630 may determine the cost of processing the rendered card based on the interchange fee, card network fee, and processor fee. Further, the processing engine 630 may determine a convenience fee and/or incentive using different algorithms based on price elasticity, volume of card transactions, customer demand, recurring nature of the transaction or other economic factors. Alternative embodiments include that the different algorithms calculate dynamically the convenience fee based on a discount from a static convenience fee. The static convenience fee may be determined by the factors mentioned above. Moreover, the cost associated in processing a debit card is typically lower than the cost of processing a credit card. Thus, if the rendered card was a credit card, the client computing device 605 may suggest to the customer to use a debit card having a lower convenience fee. As a result, the processing engine 630 may cause the BIN look up engine 620 and rate look up engine 627 to access BIN and rate table information for a debit card. Further, due to the Durban legislation, the BIN and rate table information for two different debit card processing networks may be provided. The processing engine 630 determines the cost of processing a debit card on the different debit card processing networks and selects the lower cost. In addition, the processing engine 630 determines a convenience fee and incentive based on the cost as well as using different algorithms based on price elasticity, volume of card transactions, customer demand, recurring nature of the transaction or other economic factors. Alternative embodiments include that the different algorithms calculate the convenience fee or incentive based on a discount from a static cost of processing the card As a result, the client computing device 605 may suggest a convenience fee and/or incentive corresponding to a debit card.

In addition, prior to determining the cost of processing a rendered card, the processing engine 630 may request then receive other card and cardholder information such as the expiration date, security code, cardholder address, or PIN as well as the merchant type and transaction type. The processing engine may then cause the BIN look up engine 620 and the rate look up engine 627 to access different BIN and rate table information that provides a lower cost for processing the rendered card.

Each of the communication interfaces (635-650) shown in FIG. 5 may be software or hardware associated in communicating to other devices. The communication interfaces (635-650) may be of different types that include an API, a card reader implementing Near Field Communication (NFC) protocol or some other Radio Frequency (RF) protocol or magnetic strip, a user interface, USB, Ethernet, WiFi, WiMax, wireless, optical, cellular, voice, or any other communication interface coupled to communication network.

An intra-device communication link 655 between the processor bank 610, storage device bank 615, software applications 617, and communication interfaces (635-650) may be one of several types that include a bus or other communication mechanism.

Persons of ordinary skill in the art would understand that some of the components of the client computing device 605 shown in FIG. 4 may be split between one or more computer servers such as between a merchant server and a Facilitator server or a financial institution server, or a subset thereof.

Figure 6:
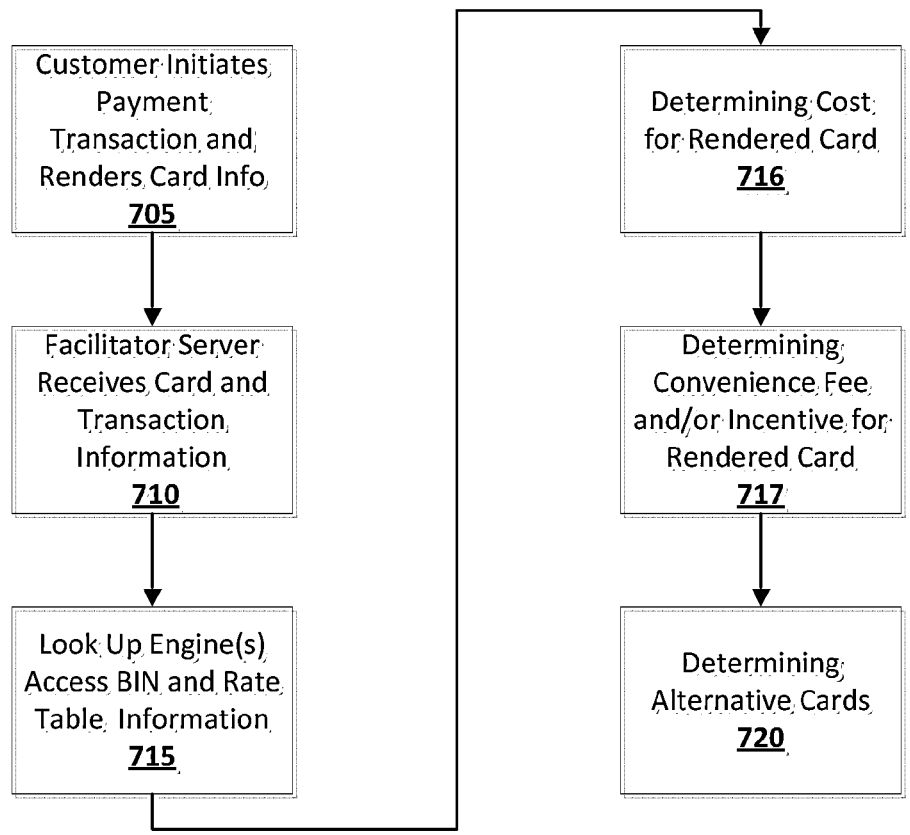
FIG. 6 is an exemplary flowchart of an example method for managing payment transactions in accordance with embodiments of the present disclosure.

FIG. 6 is an exemplary flowchart 700 of an example method for managing payment transactions in accordance with embodiments of the present disclosure. In an example step of the example method 700, a customer initiates a payment transaction with a merchant and renders card information, as shown in block 705. The customer may initiate the transaction using one of various client computing devices that include but are not limited to a smartphone, mobile phone, tablet computer, notebook computer, laptop computer, desktop computer, land-line telephone, stationary POS terminal, portable POS terminal or any other client device. Further, the customer renders a credit card or a debit card to initiate the payment transaction and uses a software application to facilitate completion of the payment transaction such as a checkout procedure or software program (e.g. web browser). The software application may be developed and operated by a merchant or Facilitator to whom the customer is rendering payment or may be developed or operated by another third party. When initiating the payment transaction, the customer may render relevant card information that includes, but is not limited to, the card number, expiration date, security code, cardholder address, PIN, transaction type, and merchant type. An additional step in the example method 700 may be that a Facilitator server receives the card (e.g. credit card, debit card, etc.) and transaction information, as shown in block 710. The Facilitator computer server may be as the one described in reference to FIGS. 1A-4. Further, the Facilitator computer server may verify the card information by applying certain business rules (e.g. checking card number length, valid number sequence, etc.). A further step in the example method may be one or more look up software engines implemented or running on the Facilitator server access BIN and rate tables that have fee information associated with different card processing networks for different credit cards and debit cards, as shown in block 715. Further, the BIN and rate table information may include an interchange fee, card network fee, and processor fee.

A further step in the example method 700 may include a processing engine on the Facilitator server to determine the cost of the rendered card based on the interchange fee, card network fee, and processor fee, as shown in block 716. An additional step may be determining a convenience fee and/or incentive of the rendered card by a processing engine or incentive engine residing on the Facilitator server, as shown in block 717. Another step may include the processing engine determining alternative cards that may have a lower cost to process, as shown in block 720. Such a step may include the processing engine causing the look up engines to access BIN and rate table information for alternative cards then determining a convenience fee and/or incentive for each alternative card. Such cards may then be suggested, provided or presented to the customer. These alternative cards may also be cards that are suggested to the user to render to lower cost or convenience fee of the transaction or provide a larger incentive.

In one embodiment, the customer may initiate the payment transaction using a credit card that incurs the card holder a convenience fee of $5. However, the processing engine analyzes the fees associated with other credit cards and debit cards. The processing engine on the server may cause the software application on the client computing device to display/suggest alternative cards such as a debit card that would incur only $1 convenience fee. Reasons for issuers, acquirers, and/or card networks to charge a lower fee for debit card transactions compared to credit card transaction is because identity of the debit card holder may be verified at the time of the payment transaction with a personal identification number (PIN). In another embodiment, the merchant may absorb the fees associated with all credit card and debit card transactions.

In another example, a customer for a merchant interacts with a POS terminal or telephone and renders a card for payment to purchase goods or services. The POS terminal may interact with a merchant server or a Facilitator server to determine the transaction cost to be $4.30. Based on a certain formulas determined by one or more algorithms implemented by a processing or some other software engine on the Facilitator server (or other server or computing device), the merchant may charge the customer a $7.00 convenience fee for the transaction. Such a convenience fee may be determined between the merchant and/or the Facilitator based on business data (e.g. volume of credit card transactions, etc.). The $2.70 difference between the $4.30 transaction fee and the $7.00 convenience fee is the facilitator or merchant profit for the transaction. The algorithms implemented by the software engines described in the present disclosure may include requesting more information from the customer (e.g. zip code, etc.) or prompt the customer to use a different type of card (business credit card, debit card, merchant credit card etc.) to lower the transaction fee and thereby the convenience fee (if the profit remains the same).

The embodiments of the present disclosure may be implemented in conjunction with any type of client computing device including a point-of-sale terminal as well as a client computing device having the capability to access a web-based bill payment software program. Such embodiments may include an API so the software interfaces between the client computing device and the merchant server may be abstracted so that such interfaces and parts of the software applications/engines may be implemented by a third party server such as a Facilitator server.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for managing a payment transaction, the method comprising:
    (a) receiving at a computer server, a first transaction information including a first rendered card information payment amount, and merchant type;
    (b) accessing BIN and rate information from a table, using the computer server, based on the first transaction information stored in a computer;
    (c) calculating, using the computer server, a first cost based on the BIN and rate information and calculating a first convenience fee for the first rendered card;
    (d) determining a first suggested card type by the computer server based on an algorithm implemented by software such that the first suggested card type has a lower cost than the first cost and a lower convenience fee than the first convenience fee;
    (e) providing the first suggested card type to a user.

2. The method of claim 1, further comprising calculating first suggested convenience fee for the first suggested card type.

3. The method of claim 2, further comprising providing first suggested convenience fee to the user.

4. The method of claim 1, wherein the first rendered card information is selected from the group consisting of a BIN or a card number.

5. The method of claim 1, wherein the table having BIN and rate information is stored in one or more storage devices.

6. The method of claim 1, further comprising storing a subset of the first transaction information by the computer server.

7. The method of claim 6, further comprising accessing the first transaction information, and processing the first transaction information on a card network.

8. The method of claim 1, further comprising:
    (a) receiving, at a computer server, a second transaction information including a second rendered card information;
    (b) accessing BIN and rate information from the table, using the computer server, based on the second transaction information;
    (c) calculating, using the computer server, a second cost based on the BIN and rate table information and a second convenience fee for the second rendered card.

9. The method of claim 8, further comprising:
    (a) determining a second suggested card type by the computer server based on an algorithm implemented by software such that the second suggested card type has a lower cost than the first cost and the second cost, and the second suggested card type has a lower convenience fee than the first convenience fee and the second convenience fee;
    (b) providing the second suggested card type to the user.

10. The method of claim 9, wherein the suggested card type is selected from the group consisting of a credit card, debit card, prepaid card, charge card, reward credit card, corporate credit card, rewards debit card, retailer credit card, and gift card.

11. The method of claim 8, further comprising:
    storing a subset of the first transaction information by the computer server;
    storing a subset of the second transaction information by the computer server.

12. The method of claim 11, further comprising receiving instructions from the user to select one of the rendered cards for the transaction, accessing the transaction information corresponding to the selected rendered card, and processing the transaction information on a card network.

13. The method of claim 1, further comprising determining that a rendered card is on a blocking list stored by the computer server further blocking the processing of the rendered card.

14. The method of claim 1, wherein transaction information is selected from the group consisting of payment information, payment amount, transaction type, merchant information, the merchant type, merchant category, card information, card type, the card number, BIN, card expiration date, cardholder address, PIN, security code, asset size of the card issuer, and card networks of which the card issuer is a member.

15. The method of claim 1, wherein the suggested card type is selected from the group consisting of a credit card, debit card, prepaid card, charge card, reward credit card, corporate credit card, rewards debit card, retailer credit card, and gift card.

16. A system for managing a payment transaction, the system comprising:
    (a) one or more processors;
    (b) one or more storage devices, each coupled to the one or more processors;
    (c) one or more communication interfaces coupled to the one or more processors and capable of being coupled to one or more communication networks;
    (d) one or more software applications residing on the system, implemented by the one or more processors, the one of more software applications including:

(1) a processing engine that receives a first transaction information including a first rendered card information, payment amount, and merchant type;
(2) one or more look up engines that (i) access BIN and rate information from a table based on the first transaction information stored in a computer; and (ii) pass the BIN and rate table information to the processing engine;
(3) the processing engine further: (i) calculates a first cost based on the BIN and rate information and calculates a first convenience fee for the first rendered card; (ii) determines a first suggested card type based on an algorithm implemented by software such that the first suggested card type has a lower cost than the first cost and a lower convenience fee than the first convenience fee; (iii) provides the first suggested card type to a user.

17. The system of claim 16, wherein the processing engine calculates a first suggested convenience fee for the first suggested card type.

18. The system of claim 17, wherein the processing engine provides first suggested convenience fee to the user.

19. The system of claim 16, wherein the first rendered card information is selected from a group consisting of a BIN or a card number.

20. The system of claim 16, wherein the table having BIN and rate information is stored in one or more storage devices.

21. The system of claim 16, wherein the processing engine stores a subset of the first transaction information in the one or more storage devices.

22. The system of claim 21, wherein the computer server accesses the first transaction information, and processes the first transaction information on a card network.

23. The system of claim 16, wherein:
the processing engine receives a second transaction information including a second rendered card information;
the one or more look-up engines access BIN and rate information from the table based on the second transaction information;
the processing engine further calculates a second cost based on the BIN and rate table information and a second convenience fee for the second rendered card.

24. The system of claim 23, wherein the processing engine (i) determines a second suggested card type based on an algorithm implemented by software such that the second suggested card type has a lower cost than the first cost and the second cost, and the second suggested card type has a lower convenience fee than the first convenience fee and the second convenience fee; and (ii) provides the second suggested card type to the user.

25. The system of claim 24, wherein the suggested card type is selected from the group consisting of a credit card, debit card, prepaid card, charge card, reward credit card, corporate credit card, rewards debit card, retailer credit card, and gift card.

26. The system of claim 23, wherein the processing engine:
stores a subset of the first transaction information in the one or more storage devices;
stores a subset of the second transaction information in the one or more storage devices.

27. The system of claim 26, wherein the computer server receives instructions from the user to select one of the rendered cards for the transaction, accesses the transaction information corresponding to the selected rendered card, and processes the transaction information on a card network.

28. The system of claim 16, wherein the processing engine determines that a rendered card is on a blocking list stored by the computer server further blocking the processing of the rendered card.

29. The system of claim 16, wherein transaction information is selected from the group consisting of payment information, payment amount, the transaction type, merchant information, merchant type, merchant category, card information, card type, the card number, BIN, card expiration date, cardholder address, PIN, security code, asset size of the card issuer, and card networks of which the card issuer is a member.

30. The system of claim 16, wherein the suggested card type is selected from the group consisting of a credit card, debit card, prepaid card, charge card, reward credit card, corporate credit card, rewards debit card, retailer credit card, and gift card.

* * * * *